(12) United States Patent
Greiner et al.

(10) Patent No.: US 9,851,969 B2
(45) Date of Patent: Dec. 26, 2017

(54) FUNCTION VIRTUALIZATION FACILITY FOR FUNCTION QUERY OF A PROCESSOR

(75) Inventors: Dan F. Greiner, San Jose, CA (US); Damian Leo Osisek, Vestal, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1010 days.

(21) Appl. No.: 12/822,358

(22) Filed: Jun. 24, 2010

(65) Prior Publication Data
US 2011/0320825 A1 Dec. 29, 2011

(51) Int. Cl.
| G06F 15/00 | (2006.01) |
| G06F 7/38 | (2006.01) |
| G06F 9/00 | (2006.01) |
| G06F 9/44 | (2006.01) |
| G06F 9/30 | (2006.01) |
| G06F 9/455 | (2006.01) |

(52) U.S. Cl.
CPC ...... *G06F 9/30003* (2013.01); *G06F 9/30181* (2013.01); *G06F 9/30196* (2013.01); *G06F 9/45541* (2013.01)

(58) Field of Classification Search
None
See application file for complete search history.

(56) References Cited

U.S. PATENT DOCUMENTS

| 3,626,427 A | 12/1971 | MacSorley |
| 5,551,013 A | 8/1996 | Beausoleil et al. |
| 5,574,873 A | 11/1996 | Davidian |
| 5,640,503 A | 6/1997 | Alpert |
| 5,758,140 A | 5/1998 | Kahle |
| 5,790,825 A | 8/1998 | Traut |
| 6,009,261 A | 12/1999 | Scalzi et al. |
| 6,076,156 A | 6/2000 | Pickett et al. |
| 6,092,185 A | 7/2000 | Slegel et al. |
| 6,138,229 A | 10/2000 | Kucukcakar et al. |
| 6,308,255 B1 | 10/2001 | Gorishek, IV et al. |
| 6,427,202 B1 | 7/2002 | Richardson |

(Continued)

FOREIGN PATENT DOCUMENTS

| CN | 101681269 A1 | 5/2008 |
| EP | 0730226 | 9/1996 |

(Continued)

OTHER PUBLICATIONS

Altman et al. (DAISY: Dynamic Compilation for 100% Architectural Compatibility, 1997, pp. 26-37).*

(Continued)

*Primary Examiner* — George Giroux
(74) *Attorney, Agent, or Firm* — Steven Chiu, Esq.; Blanche E. Schiller, Esq.; Heslin Rothenberg Farley & Mesiti P.C.

(57) ABSTRACT

Selected installed function of a multi-function instruction is hidden such that even though a processor is capable of performing the hidden installed function, the availability of the hidden function is hidden such that responsive to the multi-function instruction querying the availability of functions, only functions not hidden are reported as installed.

10 Claims, 21 Drawing Sheets

(56) References Cited

U.S. PATENT DOCUMENTS

| | | |
|---|---|---|
| 6,463,582 B1 | 10/2002 | Lethin et al. |
| 7,493,483 B2 | 2/2009 | McIntosh |
| 7,865,948 B1 | 1/2011 | Barnes et al. |
| 7,925,923 B1 | 4/2011 | Hyser |
| 7,984,108 B2 | 7/2011 | Landis et al. |
| 8,479,195 B2 | 7/2013 | Adams et al. |
| 8,572,606 B1 | 10/2013 | Agesen |
| 2004/0031022 A1 | 2/2004 | Kabasawa |
| 2004/0230816 A1 | 11/2004 | Lundvall et al. |
| 2005/0102489 A1* | 5/2005 | Kim et al. ............ 712/24 |
| 2005/0188171 A1 | 8/2005 | McIntosh |
| 2005/0251652 A1 | 11/2005 | Nallusamy |
| 2005/0289542 A1 | 12/2005 | Uhlig |
| 2007/0028244 A1 | 2/2007 | Landis |
| 2008/0148016 A1 | 6/2008 | Abe |
| 2008/0201554 A1* | 8/2008 | Lundvall et al. ............ 712/24 |
| 2008/0263407 A1* | 10/2008 | Yamamoto ............ 714/44 |
| 2009/0070760 A1 | 3/2009 | Khatri et al. |
| 2009/0222814 A1 | 9/2009 | Astrand |
| 2010/0138828 A1 | 6/2010 | Hanquez et al. |
| 2010/0153690 A1 | 6/2010 | Vick |
| 2010/0257338 A1* | 10/2010 | Spracklen et al. ............ 712/208 |
| 2011/0320825 A1 | 12/2011 | Greiner et al. |

FOREIGN PATENT DOCUMENTS

| | | |
|---|---|---|
| JP | S60159948 A | 8/1985 |
| JP | 62123552 A | 6/1987 |
| JP | 2004127255 A | 4/2004 |
| JP | 2005149361 A | 6/2005 |
| JP | 2005242510 A | 9/2005 |
| JP | 2006221606 A | 8/2006 |
| JP | 2006526202 A | 11/2006 |
| JP | 2008171428 A | 7/2008 |
| JP | 2008299847 A | 12/2008 |
| KR | 19970059922 A | 8/1997 |
| WO | WO 00/67115 | 11/2000 |
| WO | WO2008144553 A1 | 5/2008 |
| WO | WO2008144566 A1 | 5/2008 |

OTHER PUBLICATIONS

IBM® z/Architecture® Principles of Operation, 8th Edition, Feb. 2009, SA22-7832-07.

Edel et al. "Dynamic Instruction Set Definition", IBM Technical Disclosure Bulletin, vol. 16, No. 6, Nov. 1973.

TurboHercules SAS, Apr. 24, 2009. XP002616628. www.turbohercules.com.

Flex-ES The New Mainframe (System/390 on Intel-based Servers), Jan. 1, 2008, XP00261330, www.funsoft.com.

The Hercules System 370, ESA/390 and z/Architecture Emulator, Mar. 9, 2010, 222.hercules-390.org, 6 pages.

PCT International Search Report and Written Opinion mailed Feb. 3, 2011, PCT/EP2011/067046.

JPN6016029119, by Shinji Shioda, Network Magazine, ASCII Media Works Inc, Feb. 10, 2009, vol. 14, No. 2, pp. 114-117 (Translation).

Nikkei Byte, Nikkei Business Publications, Inc., Publication No. 2013-515735, Oct. 26, 2014, pp. 1-7.

PCT International Search Report and Written Opinion for PCT/EP2010/067045 dated Feb. 4, 2011, pp. 1-13.

AMD, "Live Migration with AMD-V Extended Migration Technology," Advanced Micro Devices, Publication No. 43781, Rev. Apr. 3, 2008, pp. 1-7.

VMWare VMotion and CPU Compatibility, VMWare Information Guide, Jun. 6, 2008, pp. 1-14.

Office Action for U.S. Appl. No. 12/822,368 dated Feb. 14, 2013, pp. 1-20.

Final Office Action for U.S. Appl. No. 12/822,368 dated Jun. 13, 2013, pp. 1-23.

Office Action for U.S. Appl. No. 12/822,368 dated Aug. 10, 2015, pp. 1-17.

Final Office Action for U.S. Appl. No. 12/822,368 dated Dec. 9, 2015, pp. 1-15.

Office Action for U.S. Appl. No. 12/822,368 dated Jun. 8, 2017, pp. 1-15.

* cited by examiner

Example
z/Architecture
Instruction
Formats
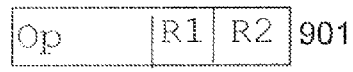
901
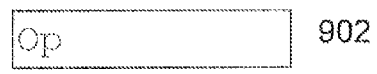
902
903
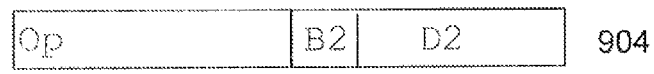
904
905
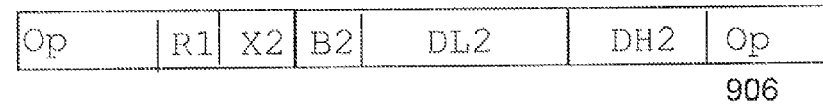
906
| | ML | FCx | |
|---|---|---|---|
| - - - - | ML | FCx | |
| - - - - | ML | FCx | |
| - - - - | ML | FCx | |
| - - - - | ML | FCx | |
| - - - - | ML | FCx | |
| - - - - | ML | FCx | |
| - - - - | ML | FCx | |
| - - - - | ML | FCx | |
Opcode Table 907
FIG. 8

1201

Set a control value for controlling availability of installed functions of a muti-function instruction in a multi-processsor system of processors having a first plurality of installed functions

1202

Execute the muti-function instruction specifying a query function to determine installed functions based on the value to determine a second set of installed functions being a subset of the first set

A

1203

Store a result value indicating only the second set of installed functions are available wherein the result value is bit significant, wherein a '1' indicates the function is implemented

Set the control value controlling function of a Multi-function instruction by a HYPERVISOR of a Host for a Virtual Machine having one or more logical processors assigned to one or more physical processors

1302

Determine the second installed functions based on the OpCode of the Multi-function instruction according to the control value

Set a control value for controlling availability of installed functions of a Multi-function instruction in a multiprocessor system of processors having a first plurality of installed functions

1401

Set in another virtual machine another control value for controlling availability of installed functions of a Multi-function instruction in the multiprocessor system of processors having the first plurality of installed functions

1402

Execute in the another virtual machine, the Multi-function instruction specifying a query function to determine installed functions based on the another value to determine a third set of installed functions being a subset of the first set

1403

Store a result value indicating only the third set of installed functions are available

Multi-function instruction comprises a function code for specifying the query function to be executed

1502

Multi-function instruction test bit, the query function executing using the test bit to determine if a corresponding function is installed (A)

FIG. 15

FUNCTION VIRTUALIZATION FACILITY FOR FUNCTION QUERY OF A PROCESSOR

FIELD OF THE INVENTION

The present invention is related to computer systems and more particularly to computer system processor instruction functionality.

BACKGROUND

Trademarks: IBM® is a registered trademark of International Business Machines Corporation, Armonk, N.Y., U.S.A. S/390, z900, z990 and z10 and other product names may be registered trademarks or product names of International Business Machines Corporation or other companies.

IBM has created through the work of many highly talented engineers beginning with machines known as the IBM® System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The Eighth Edition of the IBM® z/Architecture® Principles of Operation which was published February, 2009 has become the standard published reference as SA22-7832-07 and is incorporated in IBM's z10® mainframe servers. The IBM z/Architecture® Principles of Operation, Publication SA22-7832-07 is incorporated by reference in its entirety herein.

Referring to FIG. 1A, representative components of a prior art Host Computer system 50 are portrayed. Other arrangements of components may also be employed in a computer system, which are well known in the art. The representative Host Computer 50 comprises one or more CPUs 1 in communication with main store (Computer Memory 2) as well as I/O interfaces to storage devices 11 and networks 10 for communicating with other computers or storage area networks (SANs) and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit 6 and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

In FIG. 1B, an example of a prior art emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 27 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instruction(s) obtained in a Sequence & Access/Decode routine which may decode the Host instruction(s) accessed to determine a native instruction execution routine for emulating the function of the Host instruction accessed. Other facilities that are defined for the Host Computer System 50 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®, Linux can be used as well as machines which use emulation by Hercules, UMX, FSI (Fundamental Software, Inc) or Platform Solutions, Inc. (PSI), where generally execution is in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Notwithstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function 23 emulating a function of an emulated processor 1 is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; each of the above incorporated herein by reference in their entirety. These references illustrate a variety of known ways to achieve emulation of an instruction format architected for a different machine for a target machine available to those skilled in the art, as well as those commercial software techniques used by those referenced above.

SUMMARY

In an embodiment selected installed functions of a multi-function instruction are hidden, the multi-function instruction architected to perform a function of a plurality of installed functions, the hiding comprising setting a value controlling availability of installed functions to a multi-function instruction of a Host computer comprising one or more processors, a processor having a first plurality of said installed functions of the multi-function instruction, the first plurality of installed functions comprising one or more first installed functions and one or more second installed functions, and executing a multi-function instruction, the multi-function instruction comprising an opcode field, the execution comprises responsive to the multi-function instruction for which a query function is specified, performing the query function to determine installed functions available to the multi-function instruction; the query function execution using the value to determine the one or more second installed functions; and the query function execution storing a result value indicating one or more of the one or more second installed functions are not available to the multi-function instruction.

In an embodiment, the value is set by a hypervisor of the Host computer for a virtual machine of the Host computer, the virtual machine comprising one or more logical processors, the one or more logical processors being assigned to one or more physical processors, a physical processor having the one or more second installed functions of the multi-function instruction, wherein the multi-function instruction is executed in the virtual machine by a logical processor of one or more logical processors on a physical processor of the one or more physical processors.

In an embodiment, the one or more second installed functions is determined based on the opcode of the multi-function instruction.

In an embodiment, the hypervisor sets another value controlling availability of installed functions to a multi-function instruction executing on another virtual machine of the Host computer system; and executes another multi-function instruction in the another virtual machine by another logical processor of one or more another logical processors; responsive to the another multi-function instruction specifying another query function, the another query function is performed to determine installed functions available to the another multi-function instruction; the another query function execution uses the another value to determine one or more third installed functions; and the another query function execution stores another result value indicating one or more of the one or more third installed functions are not available to the another multi-function instruction.

In an embodiment, the stored result value is a bit significant value, where each bit position corresponds to a function, and a bit being 1 indicates the corresponding function is installed.

In an embodiment, the query function is specified by a multi-function instruction specified function code or a multi-function instruction specified test bit.

In an embodiment, the multi-function instruction is a zArchitecture instruction consisting of any one of a cryptographic instruction, a Perform Timing Facility Function (PTFF) instruction, Perform Floating Point Operation instruction or a Perform Locked Operation instruction, wherein the cryptographic instruction comprises any one of a Cipher Message instruction, a Compute Intermediate Message instruction, a Compute Last Message Digest instruction, a Compute Last Message Digest instruction, a Compute Message Authentication Code instruction, wherein the multi-function instruction specifies a query function; responsive to the multi-function instruction being a cryptographic instruction or a PTFF instruction, the multi-function instruction specified function code to be executed is obtained, the obtained function code consisting of a query function, wherein the stored result value is a plurality of bits, each bit of the plurality of bits indicating whether a corresponding function code is supported; and responsive to the multi-function instruction being a cryptographic instruction or a PTFF instruction, the multi-function instruction specified function code to be executed is obtained, the obtained function code not being the query function, a cryptographic function or a PTFF function is performed according to the obtained function code; and responsive to the multi-function instruction being the Perform Locked Operation instruction or the Perform Floating Point Operation instruction and the multi-function instruction specified test bit being 1, a determination is made whether a multi-function instruction specified function code is installed, wherein the stored result value is a condition code value; and responsive to the multi-function instruction being the Perform Locked Operation instruction or the Perform Floating Point Operation instruction and the multi-function instruction specified test bit being 0, a Floating Point function or a locked operation is performed according to the obtained function code.

The above as well as additional objectives, features, and advantages will become apparent in the following written description.

Other embodiments and aspects are described in detail herein and are considered a part of the claimed invention. For a better understanding of advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages are apparent from the following detailed description taken in conjunction with the accompanying drawings in which:

FIG. 8 is a flow depicting an example Opcode Table;

FIGS. 12-17 depict a flow of a function query blocking techniques.

DESCRIPTION

Figure 1A:
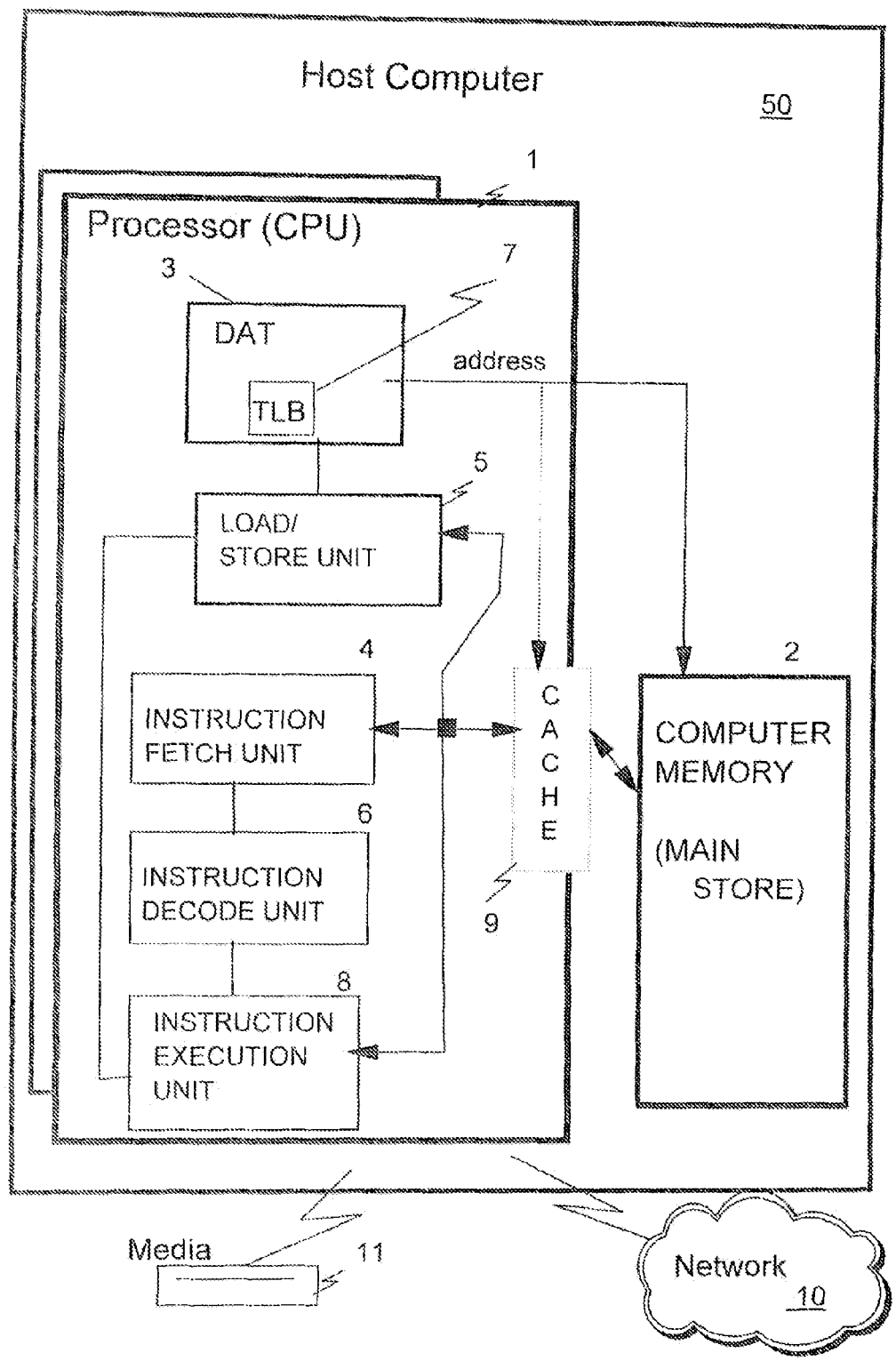
FIG. 1A is a diagram depicting an example Host computer system.
Figure 1B:
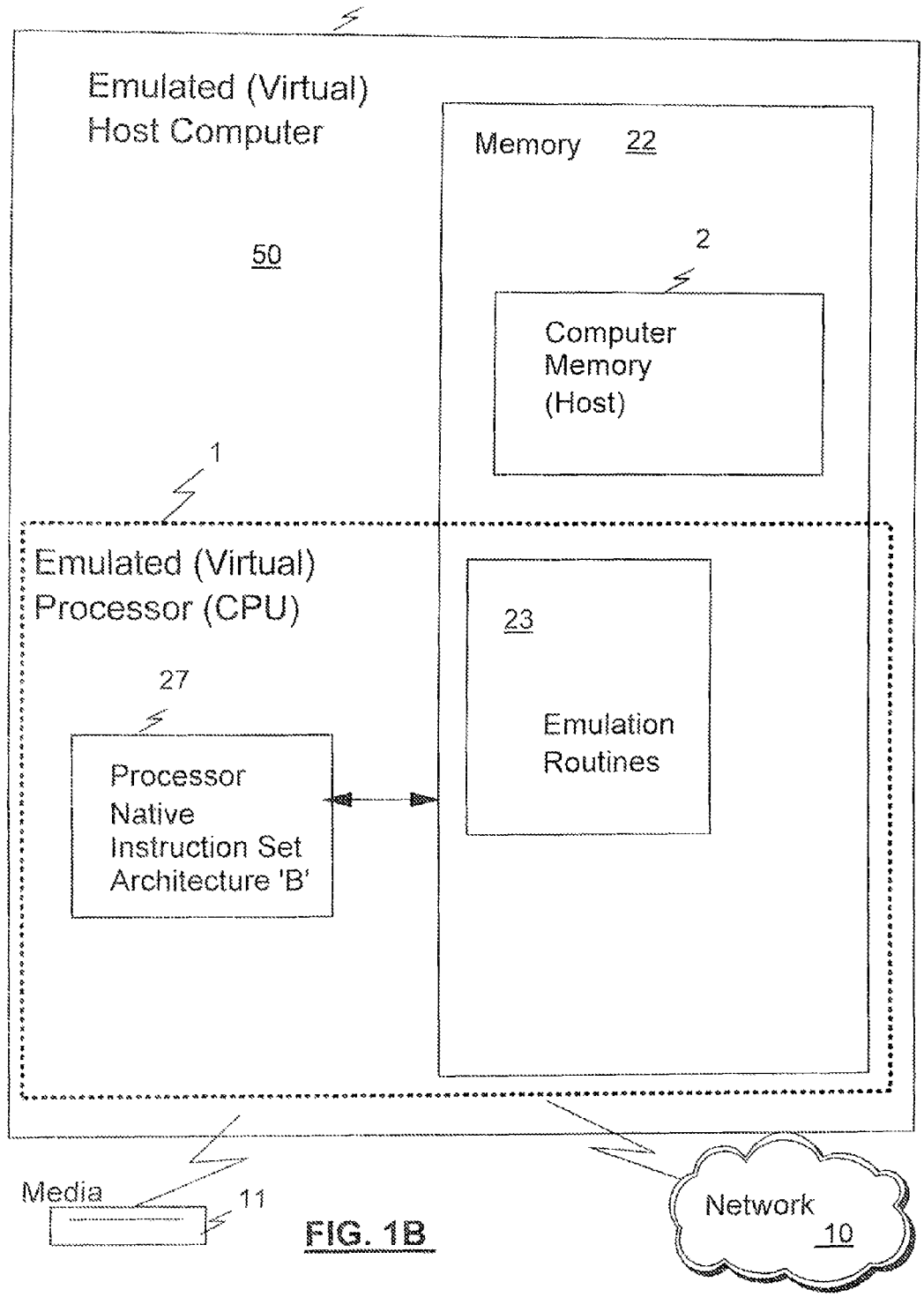
FIG. 1B is a diagram depicting an example emulation Host computer system.

Embodiments may be practiced by software (sometimes referred to Licensed Internal Code, Firmware, Micro-code, Milli-code, Pico-code and the like, any of which would be consistent with the teaching herein). Referring to FIG. 1A, a software program code embodiment is typically accessed by the processor also known as a CPU (Central Processing Unit) 1 of the system 50 from long-term storage media 11, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the memory 2, and accessed by the processor 1 using the processor bus. Such program code includes an operating system which controls the function and interaction of the various computer components and one or more application programs. Program code is normally paged from dense storage media 11 to high-speed memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 1C:
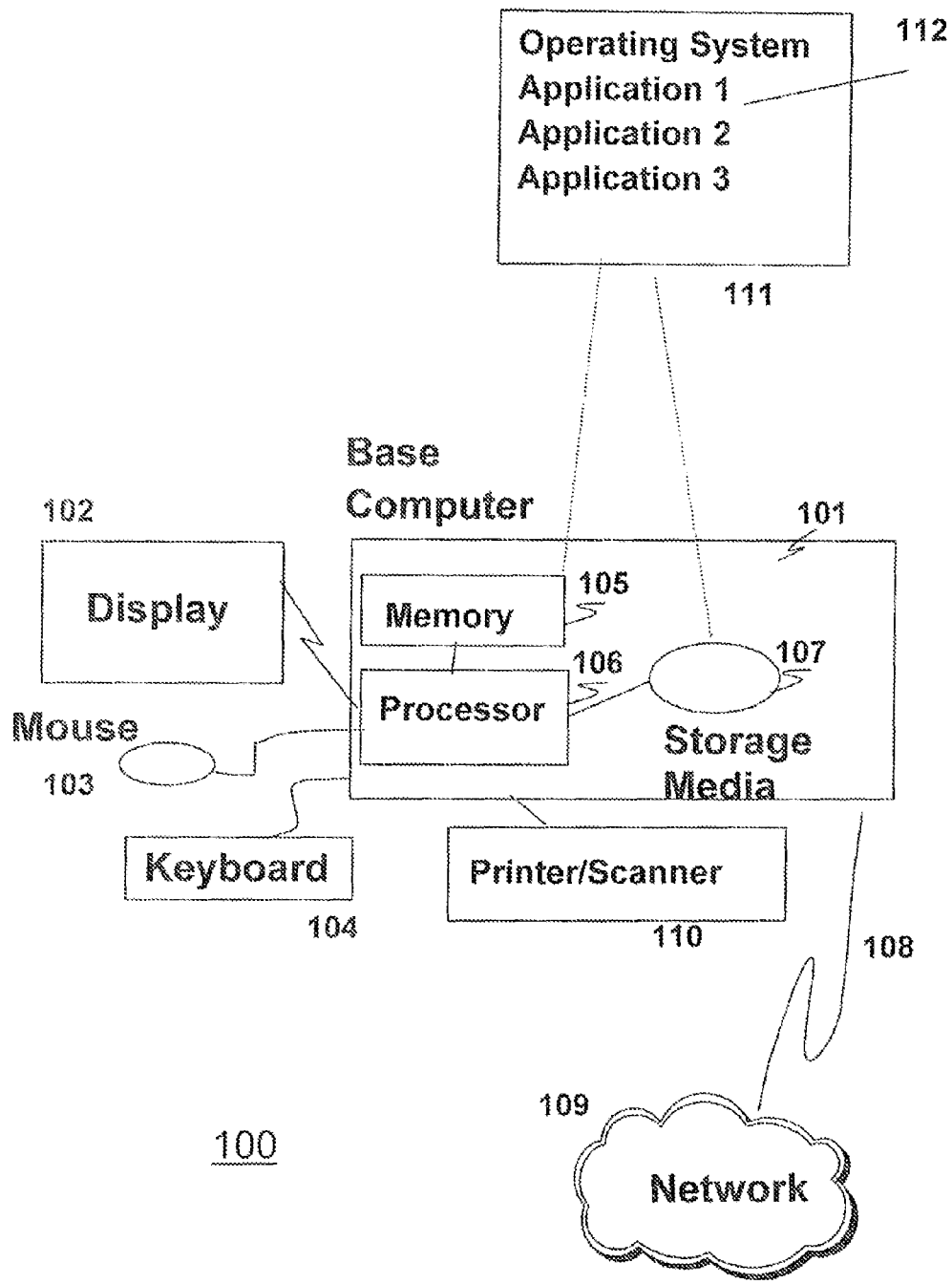
FIG. 1C is a diagram depicting an example computer system.

FIG. 1C illustrates a representative workstation or server hardware system in which embodiments may be practiced. The system 100 of FIG. 1C comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive (including any of magnetic media, CD, DVD and Flash Memory for example) or a tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
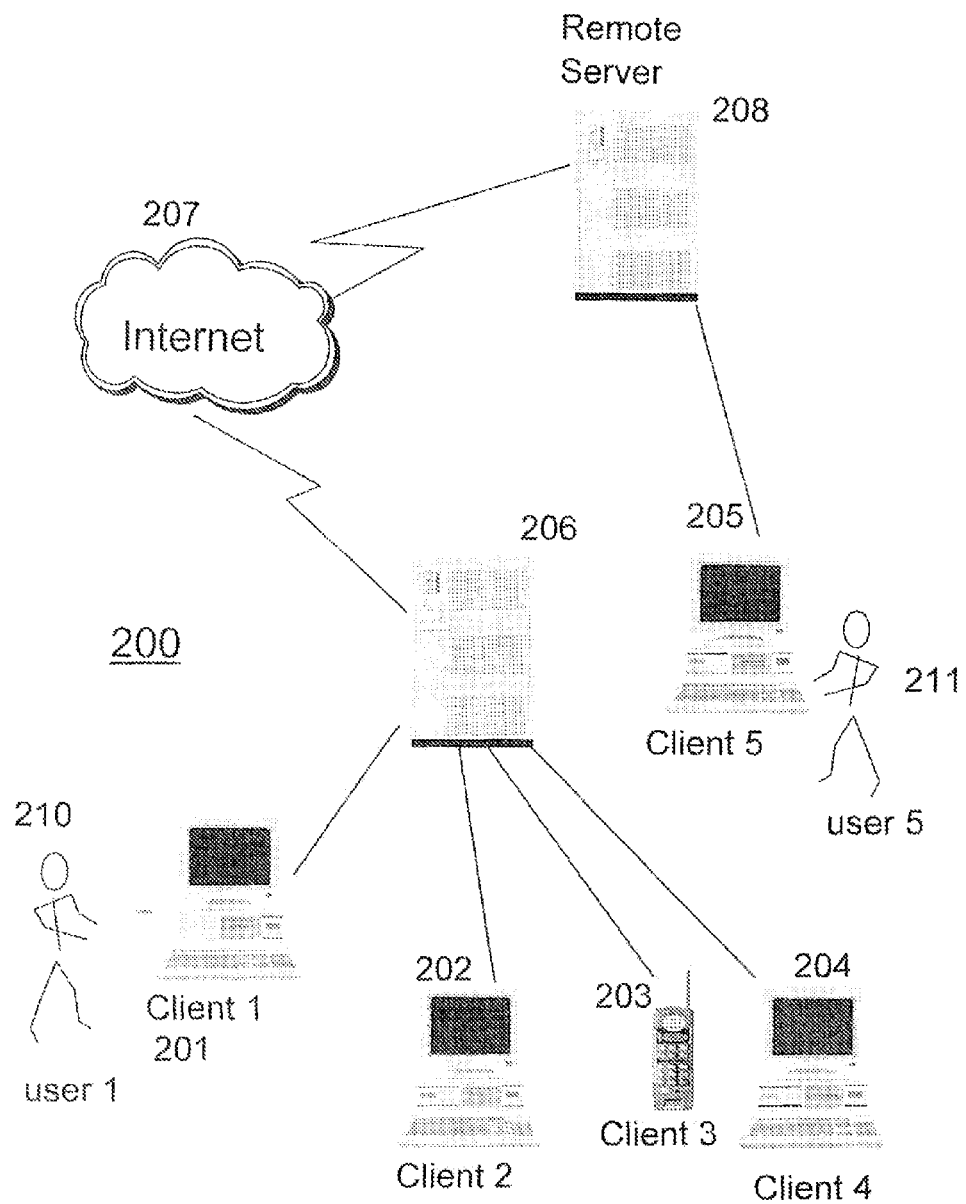
FIG. 2 is a diagram depicting an example computer network.

FIG. 2 illustrates a data processing network 200 in which an embodiment may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer™ zSeries® z9® Server available from IBM Corp.

Software programming code is typically accessed by the processor 106 of the system 101 from long-term storage media 107, such as a CD-ROM drive or hard drive. The software programming code may be embodied on any of a variety, of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 3:
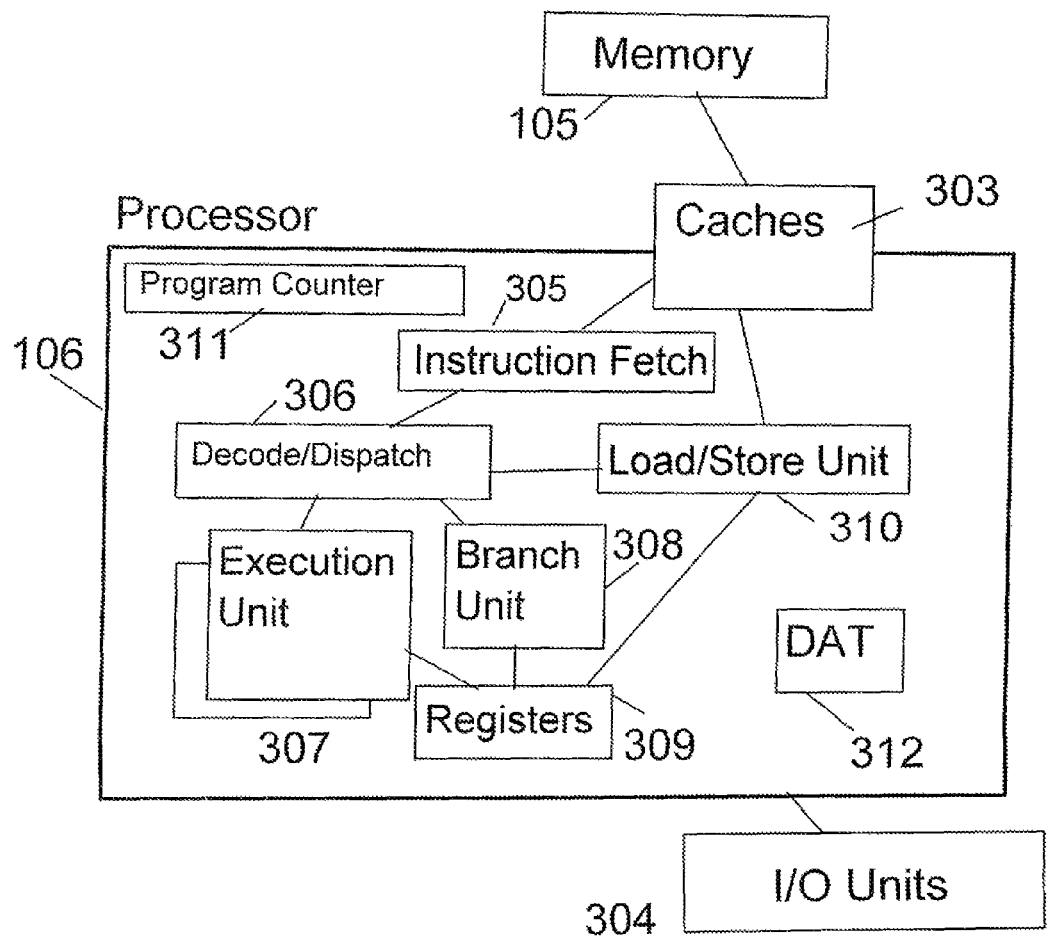
FIG. 3 is a diagram depicting example elements of a computer system.
Figure 4A:
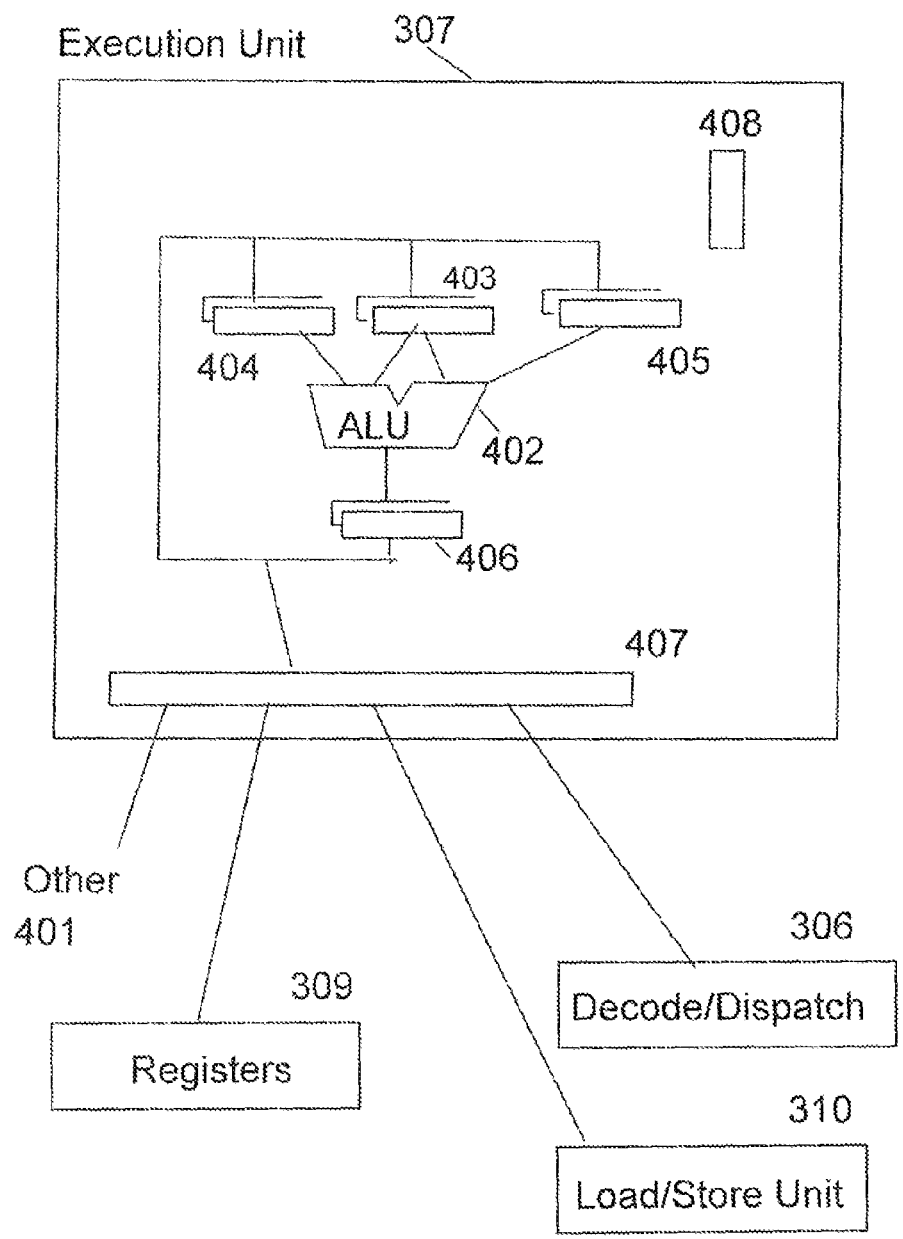
FIG. 4A is a diagram depicting an example execution unit.
Figure 4B:
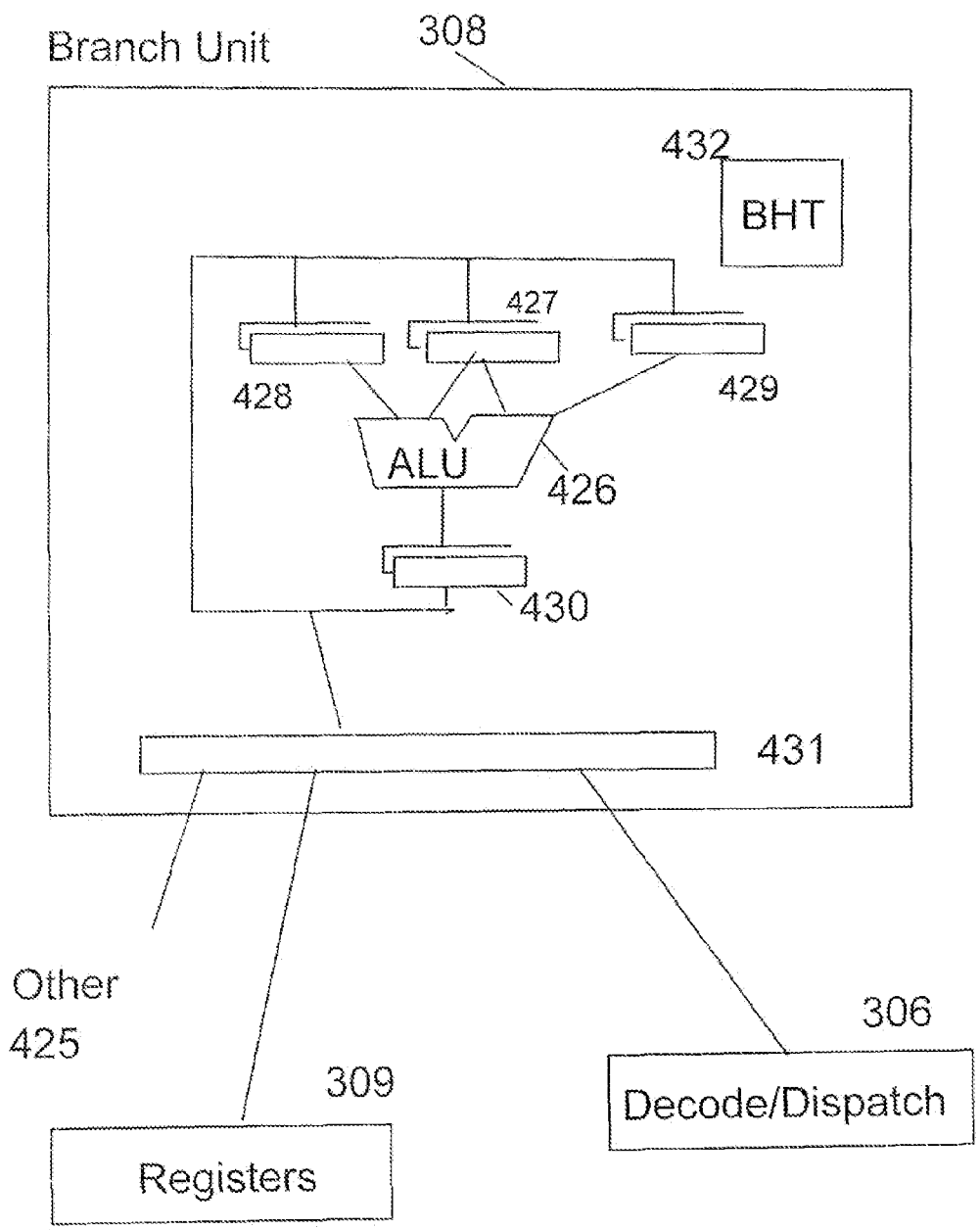
FIG. 4B is a diagram depicting an example branch unit.
Figure 4C:
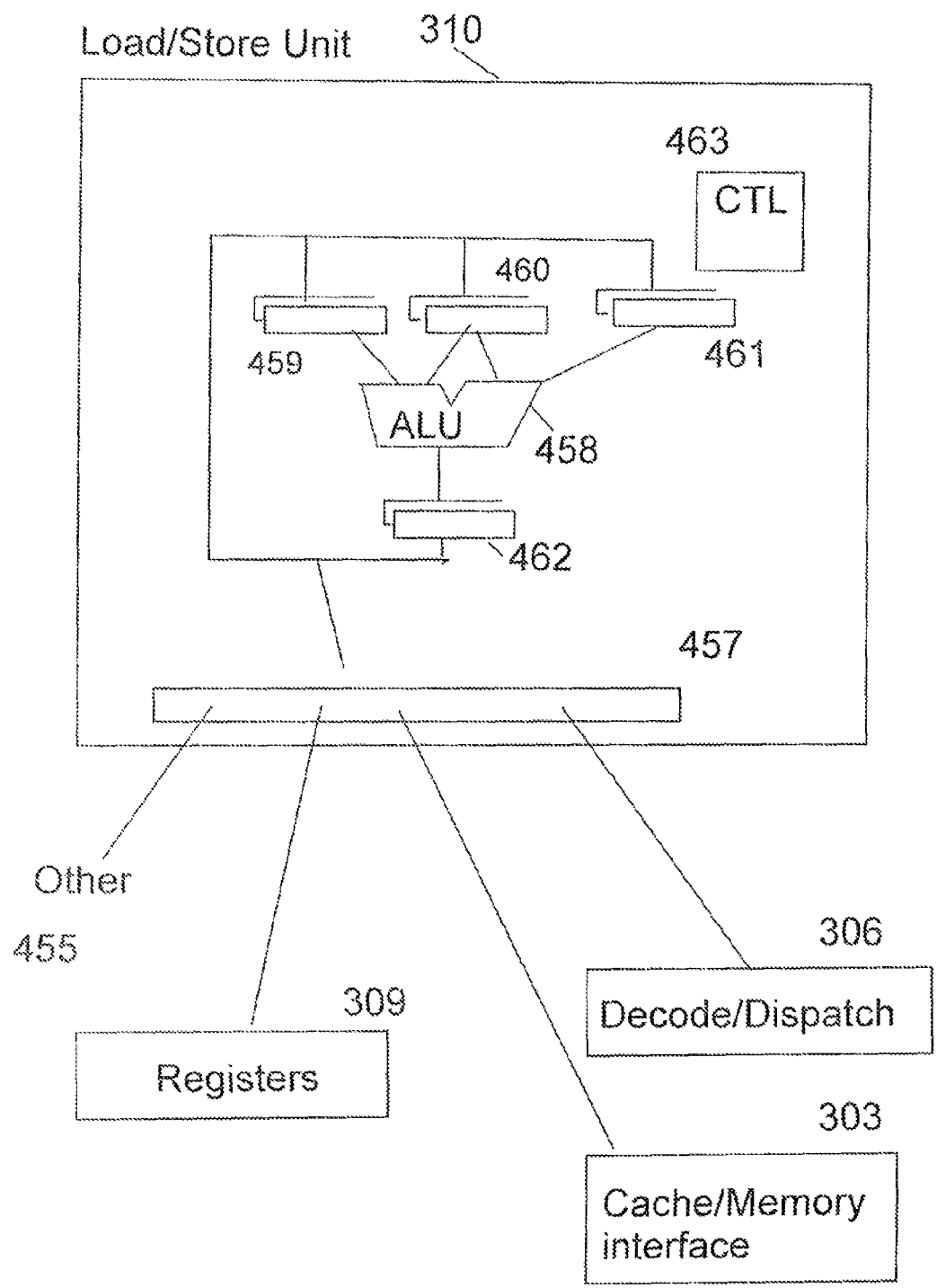
FIG. 4C is a diagram depicting an example Load/Store unit.

Referring to FIG. 3, an exemplary processor embodiment is depicted for processor 106. Typically one or more levels of Cache 303 are employed to buffer memory blocks in order to improve processor performance. The cache 303 is a high speed buffer holding cache lines of memory data that are likely to be used. Typical cache lines are 64, 128 or 256 bytes of memory data. Separate Caches are often employed for caching instructions than for caching data. Cache coherence (synchronization of copies of lines in Memory and the Caches) is often provided by various "Snoop" algorithms well known in the art. Main storage 105 of a processor system is often referred to as a cache. In a processor system having 4 levels of cache 303 main storage 105 is sometimes referred to as the level 5 (L5) cache since it is typically faster and only holds a portion of the non-volatile storage (DASD, Tape etc) that is available to a computer system. Main storage 105 "caches" pages of data paged in and out of the main storage 105 by the Operating system.

A program counter (instruction counter) 311 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the Operating system environment). The PSW of the program maintains the program counter value while the program is not active, and the program counter (in the PSW) of the operating system is used while the operating system is executing. Typically the Program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 311 is modified by either a context switch operation or a Branch taken operation of a Branch instruction for example. In a context switch operation, the current program counter value is saved in a Program Status Word (PSW) along with other state information about the program being executed (such as condition codes), and a new program counter value is loaded pointing to an instruction of a new program module to be executed. A branch taken operation is performed in order to permit the program to make decisions or loop within the program by loading the result of the Branch Instruction into the Program Counter 311.

Typically an instruction Fetch Unit 305 is employed to fetch instructions on behalf of the processor 106. The fetch unit either fetches "next sequential instructions", target instructions of Branch Taken instructions, or first instructions of a program following a context switch. Modem Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 106. In an embodiment, the fetched instruction(s) are passed to a dispatch unit 306 of the fetch unit. The dispatch unit decodes the instruction(s) and forwards information about the decoded instruction(s) to appropriate units 307 308 310. An execution unit 307 will typically receive information about decoded arithmetic instructions from the instruction fetch unit 305 and will perform arithmetic operations on operands according to the opcode of the instruction. Operands are provided to the execution unit 307 preferably either from memory 105, architected registers 309 or from an immediate field of the instruction being executed. Results of the execution, when stored, are stored either in memory 105, registers 309 or in other machine hardware (such as control registers, PSW registers and the like).

Figure 5:
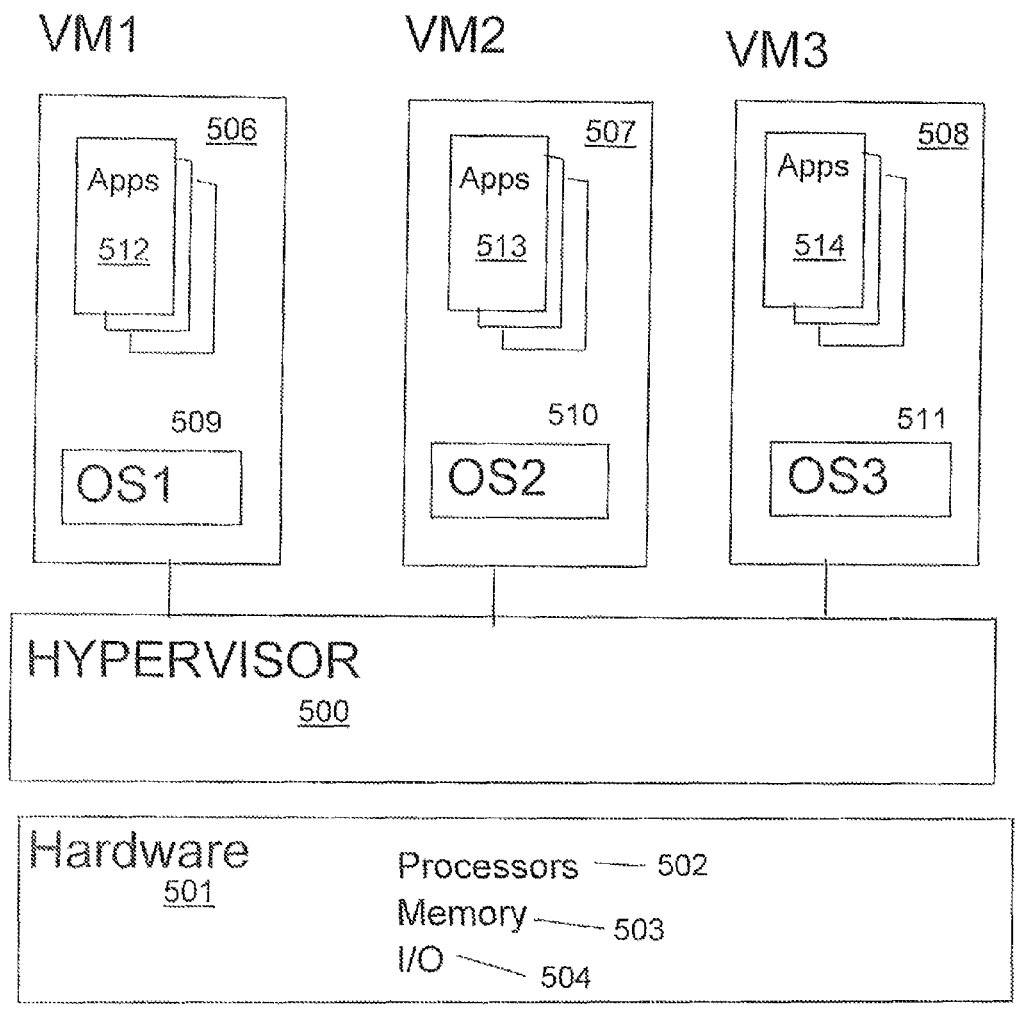
FIG. 5 is a diagram depicting an example logical portioning.

Referring to FIG. 5, an example Virtual Machine (VM) environment is shown. A Hypervisor 500 program (which may itself be an Operating System (OS) such as zVM from IBM), may be running on multi-processor "Hardware" computer system 501 comprising a plurality of physical processors 502, a physical main memory 503 and physical adapters for communicating with I/O peripheral devices 504 including storage, networks, displays and the like. The Hypervisor 500 creates VM images (VM1 506, VM2 507 and VM3 508 for example) such that software including an OS 509 510 511 and Application Programs 512 513 514 can run within the virtual machine 506 507 508 utilizing virtual resources. The software running in a VM is unaware that it is running in a VM, and operates using the virtual resources as if they were physical resources. The zVM operating system from IBM can create "Guest" images, each guest image is effectively a virtual machine. Furthermore, any zVM guest may itself run a zVM OS creating "second level Guests". Thus, a virtual machine (guest image) 508 could be nested in a hierarchy of virtual machines, each zVM playing a hypervisor role for its Guest images. On the other hand, a multi-processor platform may be "physically partitioned", each physical partition may be assigned resources (processors, memory, I/O). Each physical partition is a VM since the software running in the partition, is not aware of resources of the machine not assigned to the partition. Thus the resources of the machine are "virtualized". In another embodiment, logical partitions are VMs.

Virtualization is depicted for example in a white paper from VMware® titled "Virtualization Overview" and "VMware VMotion and CPU Compatibility" VMware® Infrastructure 3 from VMware® incorporated herein by reference. Furthermore US Patent Application Publication No. 2009/0070760 "VIRTUAL MACHINE (VM) MIGRATION BETWEEN PROCESSOR ARCHITECTURES" by Khatri et al. filed Sep. 6, 2007 and incorporated herein by reference discusses emulating certain feature set to enable a VM migration amongst similar pools of machines by masking selected bits of a CPUID register.

Figure 6:
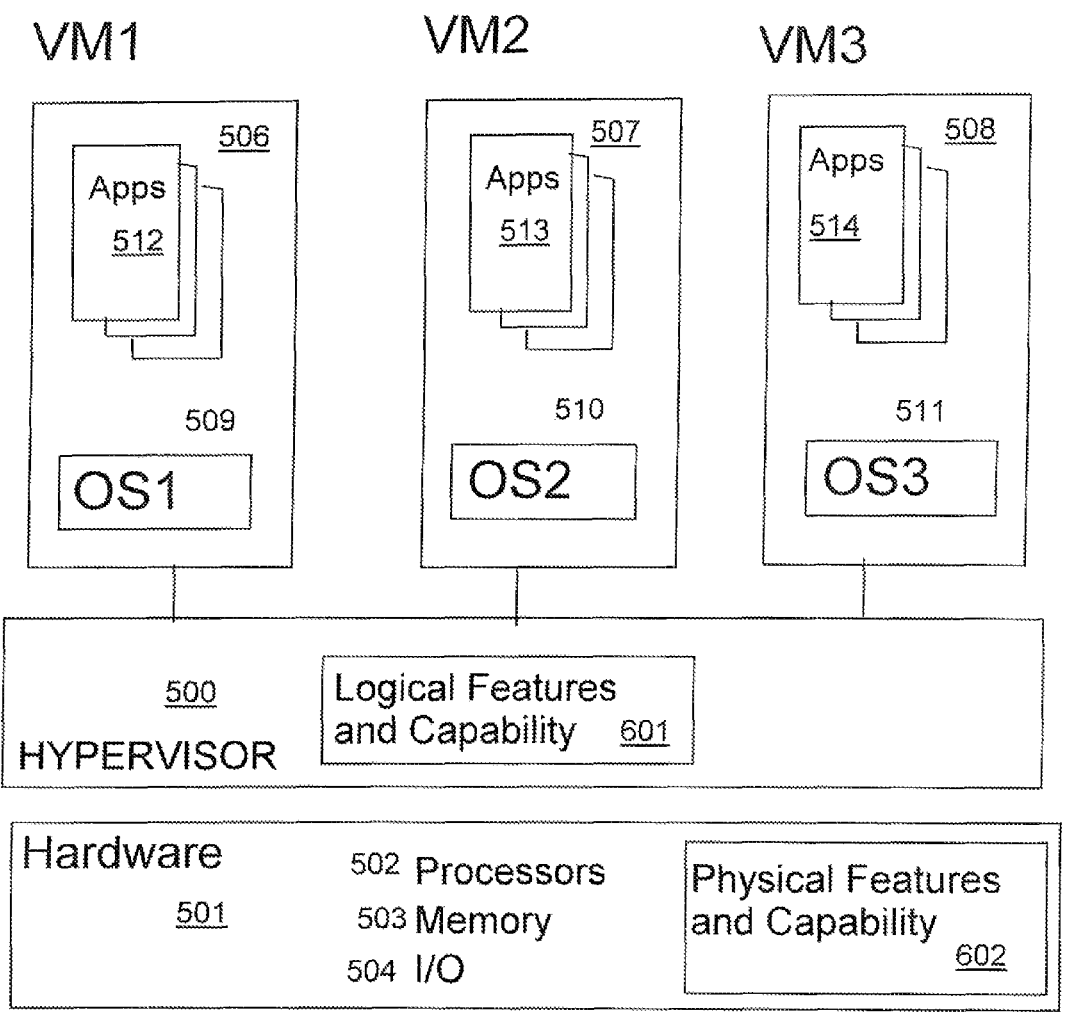
FIG. 6 is a diagram depicting example logical partitioning elements.

Referring to FIG. 6, each VM 506 507 508 may have a different OS and different applications. For example, OS 1 509 may be z/OS from IBM and OS2 510 may be zLinux from IBM, or all OSs may be the same OSs such as z/OSs.

The Hypervisor 500 creates Logical Features, 601 resources 601 and capabilities 601 for each VM based on physical features 602, resources 602 and capabilities 602. In an example system, Physical Memory 503 portions may be allotted to each VM 506 507 508 by way of Dynamic Address Translation, physical processors 502 may be time-shared amongst VMs as may be I/O capability 504.

Figure 7:
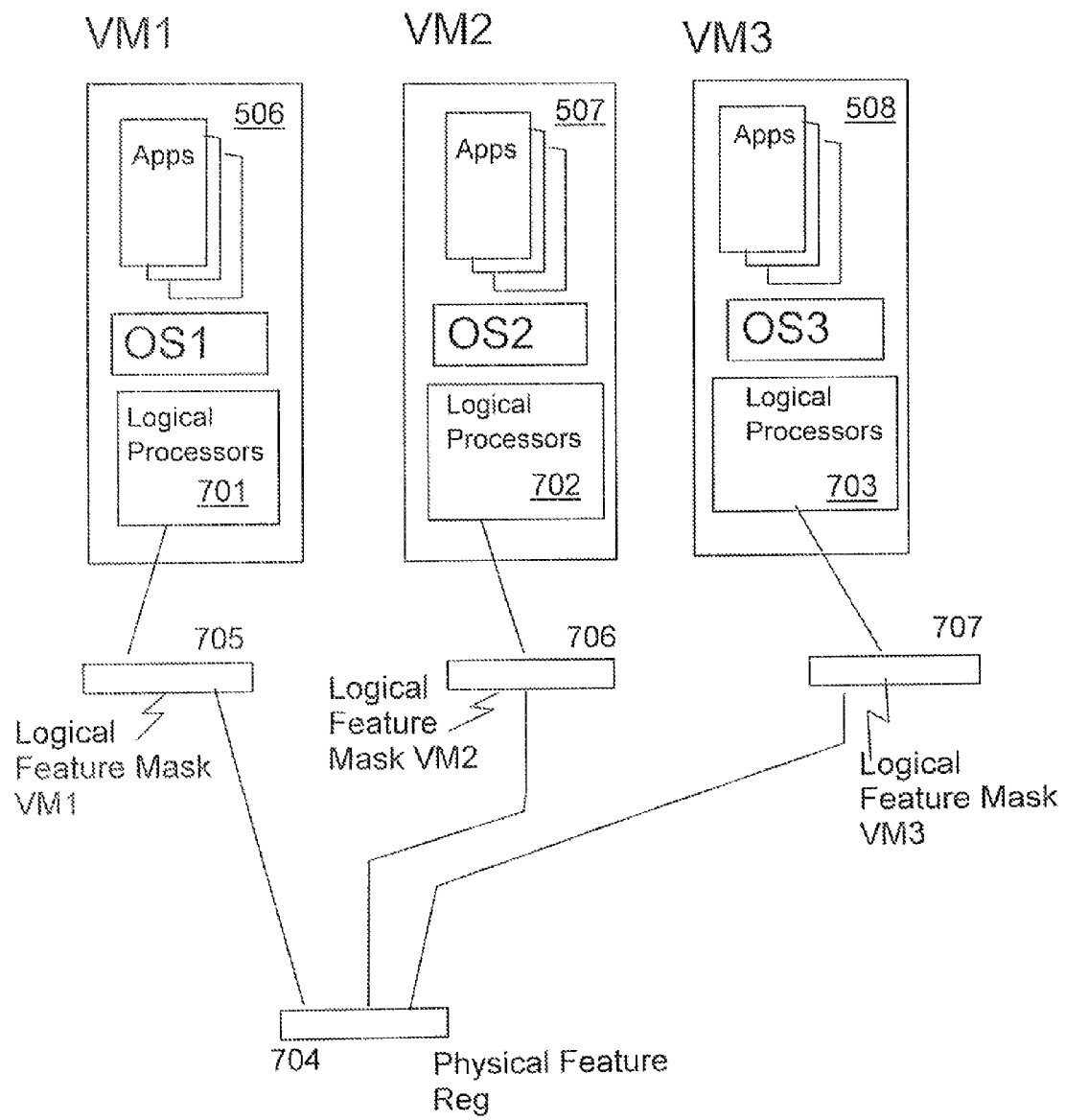
FIG. 7 is a diagram depicting example logical partitioning elements.

Referring to FIG. 7, each logical processor 701 702 703 may have access to physical feature registers 704 by way of a Hypervisor managed Logical Feature Mask 705 705 705. Thus, software running on logical processors can give the appearance of operating on a common processor Architecture level, even if the actual processors are at different Architecture levels. In an example, the Physical Feature register 704 might be an Intel CPUID register that indicates the architecture level of the Intel processor as well as specific features that are available to the programmer. The Logical feature mask 705 706 707 is programmed to provide all or a subset of the physical processors CPUID to the software in a Virtual Machine (VM) when the VM queries the CPUID of the corresponding Logical processor.

The x86 processor architecture from Intel®, "Intel® Itanium® Architecture Software Developer's Manual, Volume 2, Revision 2.2 Jan. 2006" incorporated by references, provides CPUID registers to identify features supported by a processor. The CPUID registers are unprivileged and accessed using the indirect move (from) instruction. All registers beyond register CPUID number are reserved and raise a Reserved Register/Field fault if they are accessed. Writes are not permitted and no instruction exists for such an operation. Vendor information is located in CPUID registers 0 and 1 and specify a vendor name, in ASCII, for the processor implementation. All bytes after the end of the string up to the 16th byte are zero. Earlier ASCII characters are placed in lower number register and lower numbered byte positions. CPUID register 4 provides general application-level information about processor features. It contains a set of flag bits used to indicate if a given feature is supported in the processor model. When a bit is one the feature is supported; when 0 the feature is not supported. As new features are added (or removed) from future processor models the presence (or removal) of new features will be indicated by new feature bits. CPUID register 4 is logically split into two halves, both of which contain general feature and capability information but which have different usage models and access capabilities; this information reflects the status of any enabled or disabled features. Both the upper and lower halves of CPUID register 4 are accessible through the move indirect register instruction; depending on the implementation, the latency for this access can be long and this access method is not appropriate for low-latency code versioning using self-selection. In addition, the upper half of CPUID register 4 is also accessible using the test feature instruction; the latency for this access is comparable to that of the test bit instruction and this access method enables low-latency code versioning using self selection.

The z/Architecture Principles of Operation provides a Store Facility List Extended (STFLE) instruction that like the Intel CPUID register provides the software with the knowledge of the features (or architecture levels) of the underlying Central Processing Units (CPU's) or processors. The STFLE instruction has the format shown in Table 1 below.

TABLE 1

| STFLE | D$_2$(B$_2$) | | [S] |
|---|---|---|---|
| 'B2B0' | B$_2$ | D$_2$ | |
| 0 | 16 | 20 | 31 |

The STFLE instruction (TABLE 1) comprises an Opcode field bits (0-15), a register field B2 (16-19) and a displacement (immediate) field D2 (20-31). The execution of the STFLE instruction by a machine, stores a list of bits providing information about facilities in a program memory location determined by adding the contents of the register specified by the B2 field of the instruction to the 12 bit D2 immediate field, the memory location beginning at the doubleword (8 bytes, a word is 4 bytes) specified by the second operand address ((B2)+D2). The address of the program memory location in the z/Architecture is subject to Dynamic Address Translation (DAT).

Reserved bits are bits that are not currently assigned to represent a facility. For the leftmost doublewords in which facility bits are assigned, the reserved bits are stored as zeros. Doublewords to the right of the doubleword in which the highest-numbered facility bit is assigned for a model may or may not be stored. Access exceptions and PER events are not recognized for doublewords that are not stored. The size of the second operand, in doublewords, is one more than the value specified in bits 56-63 of general register 0. The remaining bits of general register 0 are unassigned and should contain zeros; otherwise, the program may not operate compatibly in the future.

When the size of the second operand is large enough to contain all of the facility bits assigned for a model, then the complete facility list is stored in the second operand location, bits 56-63 of general register 0 are updated to contain one less than the number of doublewords needed to contain all of the facility bits assigned for the model, and condition code 0 is set.

When the size of the second operand is not large enough to contain all of the facility bits assigned for a model, then only the number of doublewords specified by the second-operand size are stored, bits 56-63 of general register 0 are updated to contain one less than the number of doublewords needed to contain all of the facility bits assigned for the model, and condition code 3 is set.

Execution of the instruction results in setting of a Condition Code value, the Condition Code value is saved during context switching with the Program Status Word (PSW).
Special Conditions
The second operand must be designated on a doubleword boundary; otherwise, a specification exception is recognized.
Resulting Condition Code:
0 Complete facility list stored
1—
2—
3 Incomplete facility list stored
Program Exceptions:
Access (store, second operand)
Operation (if the store-facility-list-extended facility is not installed)
Specification
   Programming Notes:
1. The performance of STORE FACILITY LIST EXTENDED may be significantly slower than that of simply testing a byte in storage. Programs that need to frequently test for the presence of a facility—for example, dual-path code in which the facility is used in one path but not another—should execute the STORE FACILITY LIST EXTENDED instruction once during initialization. Subsequently, the program may test for the presence of the facility by examining the stored result, using an instruction such as TEST UNDER MASK.
2. When condition code 0 is set, bits 56-63 of general register 0 are updated to indicate the number of doublewords stored. If the program chooses to ignore the results in general register 0, then it should ensure that the entire second operand in storage is set to zero prior to executing STORE FACILITY LIST EXTENDED.

TABLE 2 shows prior art z/Architecture assigned STFLE bits and their meaning. A bit is set to one regardless of the current architectural mode if its meaning is true. A meaning applies to the current architectural mode unless it is said to apply to a specific architectural mode.

Unassigned bits are reserved for indication of new facilities; these bits may be stored as ones in the future.

The prior art z/Architecture facility list is defined as shown in Table 2 below:

TABLE 2

| Bit | Meaning-When-Bit-Is-One: |
|---|---|
| 0 | The instructions marked "N3" in the instruction summary figures in Chapters 7 and 10 of z/Architecture are installed. |
| 1 | The z/Architecture architectural mode is installed. |
| 2 | The z/Architecture architectural mode is active. When this bit is zero, the ESA/390 architectural mode is active. |
| 3 | The DAT-enhancement facility is installed in the z/Architecture architectural mode. The DAT enhancement facility includes the INVALIDATE DAT TABLE ENTRY (IDTE) and COMPARE AND SWAP AND PURGE (CSPG) instructions. |
| 4 | INVALIDATE DAT TABLE ENTRY (IDTE) performs the invalidation-and-clearing operation by selectively clearing combined region-and-segment table entries when a segment-table entry or entries are invalidated. IDTE also performs the clearing-by- ASCE operation. Unless bit 4 is one, IDTE simply purges all TLBs. Bit 3 is one if bit 4 is one. |
| 5 | INVALIDATE DAT TABLE ENTRY (IDTE) performs the invalidation-and-clearing operation by selectively clearing combined region-and-segment table entries when a region-table entry or entries are invalidated. Bits 3 and 4 are ones if bit 5 is one. |
| 6 | The ASN-and-LX reuse facility is installed in the z/Architecture architectural mode. |
| 7 | The store-facility-list-extended facility is installed. |
| 8 | The enhanced-DAT facility is installed in the z/Architecture architectural mode. |
| 9 | The sense-running-status facility is installed in the z/Architecture architectural mode. |
| 10 | The conditional-SSKE facility is installed in the z/Architecture architectural mode. |
| 11 | The configuration-topology facility is installed in the z/Architecture architectural mode. |
| 16 | The extended-translation facility 2 is installed. |
| 17 | The message-security assist is installed. |
| 18 | The long-displacement facility is installed in the z/Architecture architectural mode. |
| 19 | The long-displacement facility has high performance. Bit 18 is one if bit 19 is one. |
| 20 | The HFP-multiply-and-add/subtract facility is installed. |
| 21 | The extended-immediate facility is installed in the z/Architecture architectural mode. |
| 22 | The extended-translation facility 3 is installed in the z/Architecture architectural mode. |
| 23 | The HFP-unnormalized-extension facility is installed in the z/Architecture architectural mode. |
| 24 | The ETF2-enhancement facility is installed. |
| 25 | The store-clock-fast facility is installed in the z/Architecture architectural mode. |
| 26 | The parsing-enhancement facility is installed in the z/Architecture architectural mode. |
| 27 | The move-with-optional-specifications facility is installed in the z/Architecture architectural mode. |
| 28 | The TOD-clock-steering facility is installed in the z/Architecture architectural mode. |
| 30 | The ETF3-enhancement facility is installed in the z/Architecture architectural mode. |
| 31 | The extract-CPU-time facility is installed in the z/Architecture architectural mode. |
| 32 | The compare-and-swap-and-store facility is installed in the z/Architecture architectural mode. |
| 33 | The compare-and-swap-and-store facility 2 is installed in the z/Architecture architectural mode. |
| 34 | The general-instructions-extension facility is installed in the z/Architecture architectural mode. |

TABLE 2-continued

Bit Meaning-When-Bit-Is-One:

35 The execute-extensions facility is installed in the z/Architecture architectural mode.
39 Assigned to IBM internal use.
41 The floating-point-support-enhancement facilities (FPR-GR-transfer, FPS-sign-handling, and DFP rounding) are installed in the z/Architecture architectural mode.
42 The DFP (decimal-floating-point) facility is installed in the z/Architecture architectural mode.
43 The DFP (decimal-floating-point) facility has high performance. Bit 42 is one if bit 43 is one.
44 The PFPO instruction is installed in the z/Architecture architectural mode.

An instruction may perform a single function in an architecture or, in some cases, any of a plurality of selectable functions. The selectable functions defined for an instruction may be different from machine to machine. For example, a multi-function instruction, when introduced for the first time in an architected instruction set, may have only a few selectable functions. A later architected instruction set may introduce more selectable functions to the previously introduced multi-function instruction. In an embodiment, a VM can be assigned a subset of the physical processor's selectable function whereby an instruction, running on a logical processor of the VM may query a list of available functions of the logical processor and only the functions assigned to the VM are returned, even though the physical processor can perform more selectable functions. In one embodiment, this is accomplished through a Function-Indicating-Instruction Interception Facility (FIIIF) that enables a hypervisor to trap, or intercept, execution of this query function by a guest (virtual machine), in order to present the reduced list of available functions. In another embodiment, the hypervisor specifies, for example through a bit mask, the set of functions to be reported to the guest, and the query function of the multi-function instruction reports this list. Furthermore, in an embodiment an instruction, executing on the logical processor, will experience a program exception if it attempts to perform a selected selectable function.

In the case of a multi-function instruction capable of querying the existence of installed functions and also of executing a selected one of the installed functions, the execution of the installed functions including the query function may be performed in hardware (including circuit and microcode for example) in order to achieve the best performance. In an embodiment, when the FIIIF feature is installed, the query function is intercepted by software for execution rather than hardware. Thus, only execution of the query function will encounter additional delay to determine which installed features to report. In an embodiment, the interception is to the Hypervisor code that performs the query function and returns appropriate results on behalf of the virtual machine.

An example of an instruction having selectable functions, is CIPHER MESSAGE instruction of the z/Architecture.

The CIPHER MESSAGE (KM) instruction can perform any of a plurality of a plurality of cipher message functions. One of the functions provided by CIPHER MESSAGE is to query the processor for a bit significant list of cipher message functions supported by the processor.

The format of the CIPHER MESSAGE instruction (TABLE 3) is as follows, where R1 designates a first General Register, and R2 designate a second General Register.

TABLE 3

| KM | R₁, R₂ | | | [RRE] |
|---|---|---|---|---|
| 'B92E' | //////// | R₁ | R₂ | |
| 0 | | 16 | 24 | 28 31 |

The execution of the CIPHER MESSAGE instruction (TABLE 3) is as follows.

A function specified by the function code in implied general register 0 is performed.

Bits 16-23 of the instruction are ignored.

Bit positions 57-63 of general register 0 contain the function code.

The currently assigned function codes for CIPHER MESSAGE and CIPHER MESSAGE WITH CHAINING, respectively (0-3 and 18-20) are shown in the TABLE 4. All other function codes are unassigned. For cipher functions, bit 56 is the modifier bit which specifies whether an encryption or a decryption operation is to be performed. The modifier bit is ignored for all other functions. All other bits of general register 0 are ignored.

Implied general register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address.

The query function provides the means of indicating the availability of the other functions. The contents of general registers specified by fields of the instruction (R1, R2), and R2+1 are ignored for the query function.

For all other functions, the second operand (specified by R2) is ciphered as specified by the function code using a cryptographic key in the parameter block, and the result is placed in the first-operand location.

For CIPHER MESSAGE WITH CHAINING, ciphering also uses an initial chaining value in the parameter block, and the chaining value is updated as part of the operation. Register use for 24 bit addressing is shown in TABLE 5.

The R1 field designates a general register and must designate an even-numbered register; otherwise, a specification exception is recognized.

The R2 field designates an even-odd pair of general registers and must designate an even-numbered register; otherwise, a specification exception is recognized.

The location of the leftmost byte of the first and second operands is specified by the contents of the R1 and R2 general registers, respectively. The number of bytes in the second-operand location is specified in general register R2+1. The first operand is the same length as the second operand.

As part of the operation, the addresses in general registers R1 and R2 are incremented by the number of bytes processed, and the length in general register R2+1 is decremented by the same number. The formation and updating of the addresses and length is dependent on the addressing mode.

In the 24-bit addressing mode, the contents of bit positions 40-63 of general registers R1 and R2 constitute the addresses of the first and second operands, respectively, and the contents of bit positions 0-39 are ignored; bits 40-63 of the updated addresses replace the corresponding bits in general registers R1 and R2, carries out of bit position 40 of the updated address are ignored, and the contents of bit positions 32-39 of general registers R1 and R2 are set to zeros. In the 31-bit addressing mode, the contents of bit positions 33-63 of general registers R1 and R2 constitute the addresses of the first and second operands, respectively, and the contents of bit positions 0-32 are ignored; bits 33-63 of the updated addresses replace the corresponding bits in general registers R1 and R2, carries out of bit position 33 of the updated address are ignored, and the content of bit position 32 of general registers R1 and R2 is set to zero. In the 64-bit addressing mode, the contents of bit positions 0-63 of general registers R1 and R2 constitute the addresses of the first and second operands, respectively; bits 0-63 of the updated addresses replace the contents of general registers R1 and R2, and carries out of bit position 0 are ignored.

In both the 24-bit and the 31-bit addressing modes, the contents of bit positions 32-63 of general register R2+1 form a 32-bit unsigned binary integer which specifies the number of bytes in the first and second operands, and the contents of bit positions 0-31 are ignored; bits 32-63 of the updated value replace the corresponding bits in general register R2+1. In the 64-bit addressing mode, the contents of bit positions 0-63 of general register R2+1 form a 64-bit unsigned binary integer which specifies the number of bytes in the first and second operands; and the updated value replaces the contents of general register R2+1.

In the 24-bit or 31-bit addressing mode, the contents of bit positions 0-31 of general registers R1, R2, and R2+1, always remain unchanged. The figure below depicts the contents of the general registers just described.

In the access-register mode, access registers 1, R1, and R2 specify the address spaces containing the parameter block, first, and second operands, respectively.

The result is obtained as if processing starts at the left end of both the first and second operands and proceeds to the right, block by block. The operation is ended when the number of bytes in the second operand as specified in general register R2+1 have been processed and placed at the first-operand location (called normal completion) or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

The results in the first-operand location and the chaining-value field are unpredictable if any of the following situations occur:

The cryptographic-key field overlaps any portion of the first operand.

The chaining-value field overlaps any portion of the first operand or the second operand.

The first and second operands overlap destructively. Operands are said to overlap destructively when the first-operand location would be used as a source after data would have been moved into it, assuming processing to be performed from left to right and one byte at a time.

When the operation ends due to normal completion, condition code 0 is set and the resulting value in R2+1 is zero. When the operation ends due to partial completion, condition code 3 is set and the resulting value in R2+1 is nonzero.

When a storage-alteration PER event is recognized, fewer than 4K additional bytes are stored into the first-operand locations before the event is reported.

When the second-operand length is initially zero, the parameter block, first, and second operands are not accessed, general registers R1, R2, and R2+1 are not changed, and condition code 0 is set.

When the contents of the R1 and R2 fields are the same, the contents of the designated registers are incremented only by the number of bytes processed, not by twice the number of bytes processed.

As observed by other CPUs and channel programs, references to the parameter block and storage operands may be multiple-access references, accesses to these storage locations are not necessarily block-concurrent, and the sequence of these accesses or references is undefined.

In certain unusual situations, instruction execution may complete by setting condition code 3 without updating the registers and chaining value to reflect the last unit of the first and second operands processed. The size of the unit processed in this case depends on the situation and the model, but is limited such that the portion of the first and second operands which have been processed and not reported do not overlap in storage. In all cases, change bits are set and PER storage-alteration events are reported, when applicable, for all first-operand locations processed.

Access exceptions may be reported for a larger portion of an operand than is processed in a single execution of the instruction; however, access exceptions are not recognized for locations beyond the length of an operand nor for locations more than 4K bytes beyond the current location being processed.

The function codes for CIPHER MESSAGE are as follows.

TABLE 4

| Code | Function | Parm. Block Size (bytes) | Data Block Size (bytes) |
| --- | --- | --- | --- |
| 0 | KM-Query | 16 | — |
| 1 | KM-DEA | 8 | 8 |
| 2 | KM-TDEA-128 | 16 | 8 |
| 3 | KM-TDEA-192 | 24 | 8 |
| 18 | KM-AES-128 | 16 | 16 |
| 19 | KM-AES-192 | 24 | 16 |
| 20 | KM-AES-256 | 32 | 16 |

Explanation:
— Not applicable

TABLE 5

All Addressing Modes

| GR0 | //////////////////// | M | FC |
| --- | --- | --- | --- |
| 0 | | 56 57 | 63 |

24 bit Addressing Mode

| GR1 | //////////////////// | Parameter-Block Address |
| --- | --- | --- |
| 0 | | 40    63 |

TABLE 5-continued

| R1 | ///////////////////// | First-Operand Address |
|---|---|---|
| | 0 | 40          63 |

| R2 | ///////////////////// | Second-Operand Address |
|---|---|---|
| | 0 | 40          63 |

| R2 + 1 | ///////////////// | Second-Operand Length |
|---|---|---|
| | 0 | 32          63 |

Using the CIPHER MESSAGE instruction as an example, an example machine may implement CIPHER MESSAGE functions. In the example implementation, Host processors may implement all of the functions shown (function code 0-3 and 18-20). A host Operating System (OS) (or hypervisor) may create one or more virtual machines for Guest OSs. One Virtual machine might be defined for a previous level architecture, not having CIPHER MESSAGE instructions.

According to an embodiment, if an Instruction Blocking Facility were installed and CIPHER MESSAGE instructions were designated as Blocked instructions for a VM, the Virtual machine would not permit CIPHER MESSAGE instruction execution by programs running in the Virtual machine, even though the underlying Host machine supported CIPHER MESSAGE instructions. an attempt to execute a CIPHER MESSAGE instruction in the VM would result in a program check (program exception).

According to another embodiment, if a Function blocking facility were installed and only a subset of the CIPHER MESSAGE functions (Function Codes 0-3 for example) were permitted in a VM, the Virtual machine would permit CIPHER MESSAGE execution but would not permit CIPHER MESSAGE instruction execution of CIPHER MESSAGE instructions having a function code other than 0-3 by programs running in the Virtual machine, even though the underlying Host machine supported CIPHER MESSAGE instructions supporting the function codes (0-3 and 18-20). an attempt to execute a CIPHER MESSAGE instruction having function codes other than 0-3 such as any of 18-20) would result in a program check (program exception).

In another embodiment, if a Function test/query facility were installed and only a subset of the CIPHER MESSAGE functions (Function Codes 0-3 for example) were permitted in a VM, execution of a CIPHER MESSAGE query of the CIPHER MESSAGE functions would return only function codes 0-3, even though the underlying Host machine supported function codes 0-3 and 18-20.

OTHER EXAMPLE z/Architecture MULTI-FUNCTION INSTRUCTIONS:
Compute Intermediate Message Digest (KIMD) and Compute Last Message Digest (KLMD) Instructions:

When executed by a computer system, a function specified by the function code in general register 0 is performed. Bits 16-23 of the instruction and the R1 field are ignored. Bit positions 57-63 of general register 0 contain the function code. Bit 56 of general register 0 must be zero; otherwise, a specification exception is recognized. All other bits of general register 0 are ignored. General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. All other function codes are unassigned. The query function provides the means of indicating the availability of the other functions. The contents of general registers R2 and R2+1 are ignored for the query function. For all other functions, the second operand is processed as specified by the function code using an initial chaining value in the parameter block, and the result replaces the chaining value. For COMPUTE LAST MESSAGE DIGEST, the operation also uses a message bit length in the parameter block. The operation proceeds until the end of the second-operand location is reached or a CPU-determined number of bytes have been processed, whichever occurs first. The result is indicated in the condition code. The R2 field designates an even-odd pair of general registers and must designate an even-numbered register; otherwise, a specification exception is recognized. The location of the leftmost byte of the second operand is specified by the contents of the R2 general register. The number of bytes in the second-operand location is specified in general register R2+1. As part of the operation, the address in general register R2 is incremented by the number of bytes processed from the second operand, and the length in general register R2+1 is decremented by the same number. The formation and updating of the address and length is dependent on the addressing mode. In the 24-bit addressing mode, the contents of bit positions 40-63 of general register R2 constitute the address of second operand, and the contents of bit positions 0-39 are ignored; bits 40-63 of the updated address replace the corresponding bits in general register R2, carries out of bit position 40 of the updated address are ignored, and the contents of bit positions 32-39 of general register R2 are set to zeros. In the 31-bit addressing mode, the contents of bit positions 33-63 of general register R2 constitute the address of second operand, and the contents of bit positions 0-32 are ignored; bits 33-63 of the updated address replace the corresponding bits in general register R2, carries out of bit position 33 of the updated address are ignored, and the content of bit position 32 of general register R2 is set to zero. In the 64-bit addressing mode, the contents of bit positions 0-63 of general register R2 constitute the address of second operand; bits 0-63 of the updated address replace the contents of general register R2 and carries out of bit position 0 are ignored. In both the 24-bit and the 31-bit addressing modes, the contents of bit positions 32-63 of general register R2+1 form a 32-bit unsigned binary integer which specifies the number of bytes in the second operand; and the updated value replaces the contents of bit positions 32-63 of general register R2+1. In the 64-bit addressing mode, the contents of bit positions 0-63 of general register R2+1 form a 64-bit unsigned binary integer which specifies the number of bytes in the second operand; and the updated value replaces the contents of general register R2+1. In the 24-bit or 31-bit addressing mode, the contents of bit positions 0-31 of general registers R2 and R2+1, always remain unchanged In the access-register mode, access registers 1 and R2 specify the address spaces containing the parameter block and second operand, respectively. The result is obtained as if processing starts at the left end of the second operand and proceeds to the right, block by block. The operation is ended when all source bytes in the second operand have been processed (called normal completion), or when a CPU determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case. When the chaining-value field overlaps any portion of the second operand, the result in the chaining-value field is unpredictable. For COMPUTE INTERMEDIATE MESSAGE DIGEST, normal completion occurs when the number of bytes in the second operand as specified in general register R2+1 have been processed. For COMPUTE LAST MESSAGE DIGEST, after all bytes in the second operand as specified in general register R2+1 have been processed, the padding operation is performed, and then normal completion occurs. When the operation ends due to normal completion, condition code 0 is set and the resulting value in R2+1 is zero. When the operation ends due to partial completion, condition code 3 is set and the resulting value in R2+1 is nonzero. When the second-operand length is initially zero, the second operand is not accessed, general registers R2 and R2+1 are not changed, and condition code 0 is set. For COMPUTE INTERMEDIATE MESSAGE DIGEST, the parameter block is not accessed. However, for COMPUTE LAST MESSAGE DIGEST, the empty block (L=0) case padding operation is performed and the result is stored into the parameter block. As observed by other CPUs and channel programs, references to the parameter block and storage operands may be multiple-access references, accesses to these storage locations are not necessarily block concurrent, and the sequence of these accesses or references is undefined. Access exceptions may be reported for a larger portion of the second operand than is processed in a single execution of the instruction; however, access exceptions are not recognized for locations beyond the length of the second operand nor for locations more than 4K bytes beyond the current location being processed.

KIMD-Query (KIMD Function Code 0)

A 128-bit status word is stored in the parameter block. Bits 0-127 of this field correspond to function codes 0-127, respectively, of the COMPUTE INTERMEDIATE MESSAGE DIGEST instruction. When a hit is one, the corresponding function is installed; otherwise, the function is not installed. Condition code 0 is set when execution of the KIMD Query function completes; condition code 3 is not applicable to this function.

KIMD-SHA-1 (KIMD Function Code 1)

A 20-byte intermediate message digest is generated for the 64-byte message blocks in operand 2 using the SHA-1 block digest algorithm with the 20-byte chaining value in the parameter block. The generated intermediate message digest, also called the output chaining value (OCV), is stored in the chaining-value field of the parameter block.

KIMD-SHA-256 (KIMD Function Code 2)

A 32-byte intermediate message digest is generated for the 64-byte message blocks in operand 2 using the SHA-256 block digest algorithm with the 32-byte chaining value in the parameter block. The generated intermediate message digest, also called the output chaining value (OCV), is stored in the chaining-value field of the parameter block.

KIMD-SHA-512 (KIMD Function Code 3)

A 64-byte intermediate message digest is generated for the 128-byte message blocks in operand 2 using the SHA-512 block digest algorithm with the 64-byte chaining value in the parameter block. The generated intermediate message digest, also called the output chaining value (OCV), is stored in the chaining-value field of the parameter block.

KLMD-Query (KLMD Function Code 0)

A 128-bit status word is stored in the parameter block. Bits 0-127 of this field correspond to function codes 0-127, respectively, of the COMPUTE LAST MESSAGE DIGEST instruction. When a bit is one, the corresponding function is installed; otherwise, the function is not installed. Condition code 0 is set when execution of the KLMDQuery function completes; condition code 3 is not applicable to this function.

KLMD-SHA-1 (KLMD Function Code 1)

The message digest for the message (M) in operand 2 is generated using the SHA-1 algorithm with the chaining value and message-bit-length information in the parameter block. If the length of the message in operand 2 is equal to or greater than 64 bytes, an intermediate message digest is generated for each 64-byte message block using the SHA-1 block digest algorithm with the 20-byte chaining value in the parameter block, and the generated intermediate message digest, also called the output chaining value (OCV), is stored into the chaining-value field of the parameter block. This operation repeats until the remaining message is less than 64 bytes. If the length of the message or the remaining message is zero bytes, then the operation in is performed. If the length of the message or the remaining message is between one byte and 55 bytes inclusive, then the operation is performed; if the length is between 56 bytes and 63 bytes inclusive, then the operation is performed. The message digest, also called the output chaining value (OCV), is stored into the chaining value field of the parameter block.

KLMD-SHA-256 (KLMD Function Code 2)

The message digest for the message (M) in operand 2 is generated using the SHA-256 algorithm with the chaining value and message-bit-length information in the parameter block. If the message in operand 2 is equal to or greater than 64 bytes, an intermediate message digest is generated for each 64-byte message block using the SHA-256 block digest algorithm with the 32-byte chaining value in the parameter block, and the generated intermediate message digest, also called the output chaining value (OCV), is stored into the chaining-value field of the parameter block. This operation repeats until the remaining message is less than 64 bytes. If the length of the message or the remaining message is zero byte, then the operation is performed. If the length of the message or the remaining message is between one byte and 55 bytes inclusive, then the operation is performed; if the length is between 56 bytes and 63 bytes inclusive, then the operation is performed. The message digest, also called the output chaining value (OCV), is stored into the chaining value field of the parameter block.

KLMD-SHA-512 (KLMD Function Code 3)

The message digest for the message (M) in operand 2 is generated using the SHA-512 algorithm with the chaining value and message-bit-length information in the parameter block. If the message in operand 2 is equal to or greater than 128 bytes, an intermediate message digest is generated for each 128-byte message block using the SHA-512 block digest algorithm with the 64-byte chaining value in the parameter block, and the generated intermediate message digest, also called the output chaining value (OCV), is stored into the chaining-value field of the parameter block. This operation repeats until the remaining message is less than 128 bytes. If the length of the message or the remaining message is zero byte, then the operation is performed. If the length of the message or the remaining message is between one byte and 111 bytes inclusive, then the operation is performed; if the length is between 112 bytes and 127 bytes inclusive, then the operation is performed. The message digest, also called the output chaining value (OCV), is stored into the chaining-value field of the parameter block.

Compute Message Authentication Code (KMAC) Instruction

When executed by a computer system, a function specified by the function code in general register 0 is performed. Bits 16-23 of the instruction and the R1 field are ignored. Bit positions 57-63 of general register 0 contain the function code. All other function codes are unassigned. Bit 56 of general register 0 must be zero; otherwise, a specification exception is recognized. All other bits of general register 0 are ignored. General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. The query function provides the means of indicating the availability of the other functions. The contents of general registers R2 and R2+1 are ignored. For all other functions, the second operand is processed as specified by the function code using an initial chaining value in the parameter block and the result replaces the chaining value. The operation also uses a cryptographic key in the parameter block. The operation proceeds until the end of the second operand location is reached or a CPU-determined number of bytes have been processed, whichever occurs first. The result is indicated in the condition code. The R2 field designates an even-odd pair of general registers and must designate an even-numbered register; otherwise, a specification exception is recognized. The location of the leftmost byte of the second operand is specified by the contents of the R2 general register. The number of bytes in the second-operand location is specified in general register R2+1. As part of the operation, the address in general register R2 is incremented by the number of bytes processed from the second operand, and the length in general register R2+1 is decremented by the same number. The formation and updating of the address and length is dependent on the addressing mode. In the 24-bit addressing mode, the contents of bit positions 40-63 of general register R2 constitute the address of second operand, and the contents of bit positions 0-39 are ignored; bits 40-63 of the updated address replace the corresponding bits in general register R2, carries out of bit position 40 of the updated address are ignored and, the contents of bit positions 32-39 of general register R2 are set to zeros. In the 31-bit addressing mode, the contents of bit positions 33-63 of general register R2 constitute the address of second operand, and the contents of bit positions 0-32 are ignored; bits 33-63 of the updated address replace the corresponding bits in general register R2, carries out of bit position 33 of the updated address are ignored, and the content of bit position 32 of general register R2 is set to zero. In the 64-bit addressing mode, the contents of bit positions 0-63 of general register R2 constitute the address of second operand; bits 0-63 of the updated address replace the contents of general register R2 and carries out of bit position 0 are ignored. In both the 24-bit and the 31-bit addressing modes, the contents of bit positions 32-63 of general register R2+1 form a 32-bit unsigned binary integer which specifies the number of bytes in the second operand; and the updated value replaces the contents of bit positions 32-63 of general register R2+1. In the 64-bit addressing mode, the contents of bit positions 0-63 of general register R2+1 form a 64-bit unsigned binary integer which specifies the number of bytes in the second operand; and the updated value replaces the contents of general register R2+1. In the 24-bit or 31-bit addressing mode, the contents of bit positions 0-31 of general registers R2 and R2+1, always remain unchanged. In the access-register mode, access registers 1 and R2 specify the address spaces containing the parameter block and second operand, respectively. The result is obtained as if processing starts at the left end of the second operand and proceeds to the right, block by block. The operation is ended when all source bytes in the second operand have been processed (called normal completion), or when a CPU determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case. When the chaining-value field overlaps any portion of the second operand, the result in the chaining-value field is unpredictable. Normal completion occurs when the number of bytes in the second operand as specified in general register R2+1 have been processed. When the operation ends due to normal completion, condition code 0 is set and the resulting value in R2+1 is zero. When the operation ends due to partial completion, condition code 3 is set and the resulting value in R2+1 is nonzero. When the second-operand length is initially zero, the second operand and the parameter block are not accessed, general registers R2 and R2+1 are not changed, and condition code 0 is set. As observed by other CPUs and channel programs, references to the parameter block and storage operands may be multiple-access references, accesses to these storage locations are not necessarily block concurrent, and the sequence of these accesses or references is undefined. Access exceptions may be reported for a larger portion of the second operand than is processed in a single execution of the instruction; however, access exceptions are not recognized for locations beyond the length of the second operand nor for locations more than 4K bytes beyond the current location being processed.

KMAC-Query (Function Code 0)

A 128-bit status word is stored in the parameter block. Bits 0-127 of this field correspond to function codes 0-127, respectively, of the KMAC instruction. When a bit is one, the corresponding function is installed; otherwise, the function is not installed. Condition code 0 is set when execution of the KMAC Query function completes; condition code 3 is not applicable to this function.

KMAC-DEA (Function Code 1)

The message authentication code for the 8-byte message blocks (M1, M2, . . . , Mn) in operand 2 is computed using the DEA algorithm with the 64-bit cryptographic key and the 64-bit chaining value in the parameter block. The message authentication code, also called the output chaining value (OCV), is stored in the chaining-value field of the parameter block.

KMAC-TDEA-128 (Function Code 2)

The message authentication code for the 8-byte message blocks (M1, M2, . . . , Mn) in operand 2 is computed using the TDEA algorithm with the two 64-bit cryptographic keys and the 64-bit chaining value in the parameter block. The message authentication code, also called the output chaining value (OCV), is stored in the chaining-value field of the parameter block.

KMAC-TDEA-192 (Function Code 3)

The message authentication code for the 8-byte message blocks (M1, M2, . . . , Mn) in operand 2 is computed using the TDEA algorithm with the three 64-bit cryptographic keys and the 64-bit chaining value in the parameter block. The message authentication code, also called the output chaining value (OCV), is stored in the chaining-value field of the parameter block.

Perform Locked Operation Instruction

When executed by a computer system, after the lock specified in general register 1 has been obtained, the operation specified by the function code in general register 0 is performed, and then the lock is released. However, as observed by other CPUs: (1) storage operands, including fields in a parameter list that may be used, may be fetched, and may be tested for store-type access exceptions if a store at a tested location is possible, before the lock is obtained, and (2) operands may be stored in the parameter list after the lock has been released. If an operand not in the parameter list is fetched before the lock is obtained, it is fetched again after the lock has been obtained. The function code can specify any of six operations: compare and load, compare and swap, double compare and swap, compare and swap and store, compare and swap and double store, or compare and swap and triple store. A test bit in general register 0 specifies, when one, that a lock is not to be obtained and none of the six operations is to be performed but, instead, the validity of the function code is to be tested. This will be useful if additional function codes for additional operations are assigned in the future. This definition is written as if the test bit is zero except when stated otherwise. If compare and load is specified, the first-operand comparison value and the second operand are compared. If they are equal, the fourth operand is placed in the third-operand location. If the comparison indicates inequality, the second operand is placed in the first-operand-comparison-value location as a new first-operand comparison value. If compare and swap is specified, the first-operand comparison value and the second operand are compared. If they are equal, the first-operand replacement value is stored at the second-operand location. If the comparison indicates inequality, the second operand is placed in the first-operand-comparison value location as a new first-operand comparison value. If double compare and swap is specified, the first operand comparison value and the second operand are compared. If they are equal, the third-operand comparison value and the fourth operand are compared. If both comparisons indicate equality, the first operand and third-operand replacement values are stored at the second-operand location and fourth operand location, respectively. If the first comparison indicates inequality, the second operand is placed in the first-operand-comparison-value location as a new first-operand comparison value. If the first comparison indicates equality but the second does not, the fourth operand is placed in the third-operand-comparison-value location as a new third-operand comparison value. If compare and swap and store, double store, or triple store is specified, the first-operand comparison value and the second operand are compared. If they are equal, the first-operand replacement value is stored at the second-operand location, and the third operand is stored at the fourth-operand location. Then, if the operation is the double-store or triple-store operation, the fifth operand is stored at the sixth-operand location, and, if it is the triple-store operation, the seventh operand is stored at the eighth-operand location. If the first-operand comparison indicates inequality, the second operand is placed in the first operand-comparison-value location as a new first operand comparison value. After any of the six operations, the result of the comparison or comparisons is indicated in the condition code. The function code (FC) is in bit positions 56-63 of general register 0. The function code specifies not only the operation to be performed but also the length of the operands and whether the first-operand comparison and replacement values and the third operand or third-operand comparison and replacement values, which are referred to collectively simply as the first and third operands, are in general registers or a parameter list. The pattern of the function codes is as follows: • A function code that is a multiple of 4 (including 0) specifies a 32-bit length with the first and third operands in bit positions 32-63 of general registers. • A function code that is one more than a multiple of 4 specifies a 64-bit length with the first and third operands in a parameter list. • A function code that is 2 more than a multiple of 4 specifies a 64-bit length with the first and third operands in bit positions 0-63 of general registers. • A function code that is 3 more than a multiple of 4 specifies a 128-bit length with the first and third operands in a parameter list.

For example, PLO.DCS may be used to mean PERFORM LOCKED OPERATION with function code 8. In the symbols, the letter "G" indicates a 64-bit operand length, the letter "R" indicates that some or all 64-bit operands are in general registers, and the letter "X" indicates a 128-bit operand length. Function codes that have not been assigned to operations or that specify operations that the CPU cannot perform because the operations are not implemented (installed) are called invalid. Bit 55 of general register 0 is the test bit (T). When bit 55 is zero, the function code in general register 0 must be valid; otherwise, a specification exception is recognized. When bit 55 is one, the condition code is set to 0 if the function code is valid or to 3 if the function code is invalid, and no other operation is performed. Bits 32-54 of general register 0 must be all zeros; otherwise, a specification exception is recognized. When bit 55 of the register is one, this is the only exception that can be recognized. Bits 0-31 of general register 0 are ignored. The lock to be used is represented by a program lock token (PLT) whose logical address is specified in general register 1. In the 24-bit addressing mode, the PLT address is bits 40-63 of general register 1, and bits 0-39 of the register are ignored. In the 31-bit addressing mode, the PLT address is bits 33-63 of the register, and bits 0-32 of the register are ignored. In the 64-bit addressing mode, the PLT address is bits 0-63 of the register. For the even-numbered function codes, including 0, the first-operand comparison value is in general register R1. For the even-numbered function codes beginning with 4, the first-operand replacement value is in general register R1+1, and R1 designates an even-odd pair of registers and must designate an even-numbered register; otherwise, a specification exception is recognized. For function codes 0 and 2, R1 can be even or odd. For function codes 0, 2, 12, and 14, the third operand is in general register R3, and R3 can be even or odd. For function codes 8 and 10, the third-operand comparison value is in general register R3, the third-operand replacement value is in general register R3+1, and R3 designates an even-odd pair of registers and must designate an even-numbered register; otherwise, a specification exception is recognized. For all function codes, the B2 and D2 fields of the instruction specify the second-operand address. For function codes 0, 2, 8, 10, 12, and 14, the B4 and D4 fields of the instruction specify the fourth-operand address. For function codes 1, 3, 5, 7, 9, 11, 13, 15, and 16-23, the B4 and D4 fields of the instruction specify the address of a parameter list that is used by the instruction, and this address is not called the fourth operand address. The parameter list contains odd numbered operands, including comparison and replacement values, and addresses of even-numbered operands other than the second operand. In the access-register mode, the parameter list also contains access-list-entry tokens (ALETs) associated with the even-numbered-operand addresses. In the access-register mode, for function codes that cause use of a parameter list containing an ALET, R3 must not be zero; otherwise, a specification exception is recognized. Operand addresses in a parameter list, if used, are in doublewords in the list. In the 24-bit addressing mode, an operand address is bits 40-63 of a doubleword, and bits 0-39 of the doubleword are ignored. In the 31-bit addressing mode, an operand address is bits 33-63 of a doubleword, and bits 0-32 of the doubleword are ignored. In the 64-bit addressing mode, an operand address is bits 0-63 of a doubleword. In the access-register mode, access register 1 specifies the address space containing the program lock token (PLT), access register B2 specifies the address space containing the second operand, and access register B4 specifies the address space containing a fourth operand or a parameter list. Also, for an operand whose address is in the parameter list, an accesslist-entry token (ALET) is in the list along with the address and is used in the access-register mode to specify the address space containing the operand. In the access-register mode, if an access exception or PER storage-alteration event is recognized for an operand whose address is in the parameter list, the associated ALET in the parameter list is loaded into access register R3 when the exception or event is recognized. Then, during the resulting program interruption, if a value is due to be stored as the exception access identification at real location 160 or the PER access identification at real location 161, R3 is stored. If the instruction execution is completed without the recognition of an exception or event, the contents of access register R3 are unpredictable. When not in the access-register mode, or when a parameter list containing an ALET is not used, the contents of access register R3 remain unchanged. The even-numbered (2, 4, 6, and 8) storage operands must be designated on an integral boundary, which is a word boundary for function codes that are a multiple of 4, a doubleword boundary for function codes that are one or 2 more than a multiple of 4, or a quadword boundary for function codes that are 3 more than a multiple of 4. A parameter list, if used, must be designated on a doubleword boundary. Otherwise, a specification exception is recognized. The program-lock-token (PLT) address in general register 1 does not have a boundary-alignment requirement. All unused fields in a parameter list should contain all zeros; otherwise, the program may not operate compatibly in the future. A serialization function is performed immediately after the lock is obtained and again immediately before it is released. However, values fetched from the parameter list before the lock is obtained are not necessarily re-fetched. A serialization function is not performed if the test bit, bit 55 of general register 0, is one.

Function Codes 0-3 (Compare and Load)

The first-operand comparison value is compared to the second operand. When the first-operand comparison value is equal to the second operand, the third operand is replaced by the fourth operand, and condition code 0 is set. When the first-operand comparison value is not equal to the second operand, the first-operand comparison value is replaced by the second operand, and condition code 1 is set.

Function Codes 4-7 (Compare and Swap)

The first-operand comparison value is compared to the second operand. When the first-operand comparison value is equal to the second operand, the first operand replacement value is stored at the second operand location, and condition code 0 is set. When the first-operand comparison value is not equal to the second operand, the first-operand comparison value is replaced by the second operand, and condition code 1 is set.

Function Codes 8-11 (Double Compare and Swap)

The first-operand comparison value is compared to the second operand. When the first-operand comparison value is equal to the second operand, the third operand comparison value is compared to the fourth operand. When the third-operand comparison value is equal to the fourth operand (after the first-operand comparison value has been found equal to the second operand), the first-operand replacement value is stored at the second-operand location, the third operand replacement value is stored at the fourth operand location, and condition code 0 is set. When the first-operand comparison value is not equal to the second operand, the rust-operand comparison value is replaced by the second operand, and condition code 1 is set. When the third-operand comparison value is not equal to the fourth operand (after the first-operand comparison value has been found equal to the second operand), the third-operand comparison value is replaced by the fourth operand, and condition code 2 is set.

Function Codes 12-15 (Compare and Swap and Store)

The first-operand comparison value is compared to the second operand. When the first-operand comparison value is equal to the second operand, the first operand location, the third operand is stored at the fourth-operand location, and condition code 0 is set. When the first-operand comparison value is not equal to the second operand, the first-operand comparison value is replaced by the second operand, and condition code 1 is set.

Function Codes 16-19 (Compare and Swap and Double Store)

The first-operand comparison value is compared to the second operand. When the first-operand comparison value is equal to the second operand, the first operand replacement value is stored at the second operand location, the third operand is stored at the fourth-operand location, the fifth operand is stored at the sixth-operand location, and condition code 0 is set. When the first-operand comparison value is not equal to the second operand, the first-operand comparison value is replaced by the second operand, and condition code 1 is set.

Function Codes 20-23 (Compare and Swap and Triple Store)

The first-operand comparison value is compared to the second operand. When the first-operand comparison value is equal to the second operand, the first operand replacement value is stored at the second operand location, the third operand is stored at the fourth-operand location, the fifth operand is stored at the sixth-operand location, the seventh operand is stored at the eighth-operand location, and condition code 0 is set. When the first-operand comparison value is not equal to the second operand, the first-operand comparison value is replaced by the second operand, and condition code 1 is set.

Locking

A lock is obtained at the beginning of the operation and released at the end of the operation. The lock obtained is represented by a program lock token (PLT) whose logical address is specified in general register 1 as already described. A PLT is a value produced by a model-dependent transformation of the PLT logical address. Depending on the model, the PLT may be derived directly from the PLT logical address or, when DAT is on, from the real address that results from transformation of the PLT logical address by DAT. If DAT is used, access register translation (ART)

precedes DAT in the access-register mode. A PLT selects one of a model-dependent number of locks within the configuration. Programs being executed by different CPUs can be assured of specifying the same lock only by specifying PLT logical addresses that are the same and that can be transformed to the same real address by the different CPUs. Since a model may or may not use ART and DAT when forming a PLT, access-exception conditions that can be encountered during ART and DAT may or may not be recognized as exceptions. There is no accessing of a location designated by a PLT, but an addressing exception may be recognized for the location. A protection exception is not recognized for any reason during processing of a PLT logical address. The CPU can hold one lock at a time. When PERFORM LOCKED OPERATION is executed by this CPU and is to use a lock that is already held by another CPU due to the execution of a PERFORM LOCKED OPERATION instruction by the other CPU, the execution by this CPU is delayed until the lock is no longer held. An excessive delay can be caused only by a machine malfunction and is a machine-check condition. The order in which multiple requests for the same lock are satisfied is undefined. A non-recoverable failure of a CPU while holding a lock may result in a machine check, entry into the check-stop state, or system check stop. The machine check is processing backup if all operands are undamaged or processing damage if register operands are damaged. If a machine check or the check-stop state is the result, either no storage operands have been changed or else all storage operands that were due to be changed have been correctly changed, and, in either case, the lock has been released. If the storage operands are not in either their correct original state or their correct final state, the result is system check stop.

Perform Floating-Point Operation Instruction:

When executed by a computer system, the operation specified by the function code in general register 0 is performed and the condition code is set to indicate the result. When there are no exceptional conditions, condition code 0 is set. When an IEEE non-trap exception is recognized, condition code 1 is set. When an IEEE trap exception with alternate action is recognized, condition code 2 is set. A 32-bit return code is placed in bits 32-63 of general register 1; bits 0-31 of general register 1 remain unchanged. The PERFORM FLOATING-POINT OPERATION (PFPO) instruction is subject to the AFP-register control bit, bit 45 of control register 0. For PFPO to be executed successfully, the AFP-register-control bit must be one; otherwise, an AFP-register data exception, DXC 1, is recognized. Bit 32 of general register 0 is the test bit. When bit 32 is zero, the function specified by bits 33-63 of general register 0 is performed; each field in bits 33-63 must be valid and the combination must be a valid and installed function; otherwise a specification exception is recognized. When bit 32 is one, the function specified by bits 33-63 is not performed but, instead, the condition code is set to indicate whether these bits specify a valid and installed function; the condition code is set to 0 if the function is valid and installed, or to 3 if the function is invalid or not installed. This will be useful if additional functions are assigned in the future. This definition is written as if the test bit is zero except when stated otherwise.

Bits 33-39 of GR0 specify the operation type. Only one operation type is currently defined: 01, hex, is PFPO Convert Floating-Point Radix. For the PFPO-convert-floating-point-radix operation, other fields in general register 0 include first-operand format, second operand format, control flags, and rounding method. For the PFPO-convert-floating point-radix operation, the second operand is converted to the format of the first operand and placed at the first-operand location, a return code is placed in bits 32-63 of general register 1, and the condition code is set to indicate whether an exceptional condition was recognized. The first and second operands are in implicit floating point registers. The first operand is in FPR0 (paired with FPR2 for extended). The second operand is in FPR4 (paired with FPR6 for extended).

Alternate-Exception-Action Control:

Bit 57 of general register 0 is the alternate-exception-action control. The setting of this control affects the action taken for IEEE-overflow and IEEE-underflow trap exceptions. When the alternate-exception-action control is zero, IEEE-overflow and IEEE-underflow trap exceptions are reported in the normal manner. That is, the appropriate data exception code (DXC) is placed in byte 2 of the floating-point control register, the operation is completed, and a program interruption for a data exception occurs. (As part of the program interruption, the DXC is stored at location 147.) This is called an IEEE trap exception with normal action. When the alternate-exception-action control is one, the DXC is placed in byte 2 of the floating-point control register, the operation is completed, condition code 2 is set, and program execution continues with the next sequential instruction. (There is no program interruption and the DXC is not stored at location 147.) This is called an IEEE trap exception with alternate action.

HFP-Overflow Control

Bit 58 of general register 0 is the HFP-overflow control. When the HFP-overflow control is zero, an HFP-overflow condition is reported as an IEEE-invalid-operation exception and is subject to IEEE-invalid-operation mask. When the HFP-overflow control is one, an HFP-overflow condition is reported as an IEEE-overflow exception and is subject to the IEEE-overflow mask. The HFP-overflow control is defined only for HFP targets; when other than an HFP target is specified, this bit must be zero.

HFP-Underflow Control:

For HFP targets, bit 59 of general register 0 is the HFP alternate underflow control. When the HFP-underflow control is zero, HFP underflow causes the result to be set to a true zero with the same sign as the source and underflow is not reported. (The result in this case is inexact and subject to the inexact-suppression control.) When the HFP-under-flow control is one, the condition is reported as an IEEE-underfloor exception and is subject to the IEEE-underflow mask. Bit 59 of general register 0 is defined only for HFP and DFP targets; when a BFP target is specified, this bit must be zero.

DFP Preferred Quantum Control (DPQC):

For DFP targets, bit 59 of general register 0 is the DFP preferred quantum control (DPQC). For radix conversion with DFP targets, if the delivered value is inexact, the cohort member with the smallest quantum is selected; if the delivered value is exact, selection depends on the value of bit 59 of general register 0, the DFP preferred quantum control (DPQC). When the delivered value is exact and the DPQC bit is zero, the cohort member with the largest quantum is selected. When the delivered value is exact and the DPQC bit is one, the preferred quantum is one and the cohort member with the quantum closest to one is selected.

Return Code

Regardless of what condition code is set, and independent of whether the test bit is one, a 32-bit return code is placed in bits 32-63 of general register 1; bits 0-31 of general register 1 remain unchanged. A return code is also placed in general register 1 when a program interruption occurs for an IEEE trap exception that completes; general register 1 is not updated when a program interruption occurs for an IEEE trap exception that suppresses. Thus, general register 1 is updated on a program interruption for IEEE-overflow, IEEE-underfloor, and IEEE-inexact trap exceptions, but is not updated on a program interruption for an IEEE-invalid-operation trap exception. Except where otherwise specified, the return code is a value of zero.

Sign Preservation

For PFPO convert floating-point radix, the sign of the result is the same as the sign of the source. The only exception to this is when the source is a NaN and the target is HFP; in this case, the result is the largest representable number in the target HFP format (Hmax) with the sign set to plus.

Preferred Quantum

For radix conversion with DFP targets, if the delivered value is inexact, the cohort member with the smallest quantum is selected; if the delivered value is exact, selection depends on the value of bit 59 of general register 0, the DFP preferred quantum control (DPQC). When the delivered value is exact and the DPQC bit is zero, the cohort member with the largest quantum is selected. When the delivered value is exact and the DPQC bit is one, the preferred quantum is one and the cohort member with the quantum closest to one is selected.

NaN Conversion

When converting between DFP and BFP, the sign of the NaN is always preserved, and the value of the payload is preserved, when possible. If the value of the source payload exceeds the maximum value of the target payload, the target is set to the default QNaN, but with the same sign as the source. When traps are disabled, an SNaN is converted to the corresponding QNaN, and the payload is preserved, when possible; that is, SNaN(x) is converted to QNaN(x), where x is the value of the payload. For DFP, both QNaN(0) and SNaN(0) can be represented; but in BFP, there is a representation for QNaN(0), but not for SNaN(0).

Scaled Value and Signed Scaling Exponent (□) for PFPO

When, for the PFPO-convert-floating-point-radix operation, IEEE-overflow trap action or IEEE-underflow trap action occurs, the scaled value is computed using the following steps: $\psi=b^\Omega$, $z=g\div\psi$ Where is the signed scaling exponent, b is the target radix (2, 10, or 16), $\Psi$ is the scale factor, g is the precision-rounded value, and z is the scaled value. The signed scaling exponent ($\psi$) is selected to make the magnitude of the value of the scaled result ($\Omega$) lie in the range: $1 < |z| < b$. The value of the signed scaling exponent U) treated as a 32-bit signed binary integer, is placed in bits 32-63 of general register 1; bits 0-31 of general register 1 remain unchanged. The scaled value is used as the delivered value and is placed in the result location. For DFP targets, the cohort member with the quantum nearest to the scaled preferred quantum is selected. (But it should be noted that for all currently supported conversions, the result is always inexact, so the cohort member with the smallest quantum is selected.) For BFP targets, there are no redundant representations, there is only one member in a cohort. For HFP targets, the result is normalized.

HFP Values

Unnormalized HFP values are accepted on input, but all HFP results are normalized. If an HFP result would be less than the smallest (in magnitude) representable normalized number, an HFP underflow condition exists.

HFP Overflow and Underflow for PFPO

For an HFP target of a PFPO-convert-floating-pointradix operation, the handling of overflow and underflow conditions is controlled by the HFP-overflow control and the HFP-underflow control, respectively.

HFP Overflow: An HFP-overflow condition exists when an HFP target precision's largest number (Hmax) is exceeded in magnitude by the precision rounded value. That is, when the characteristic of a normalized HFP result would exceed 127 and the fraction is not zero. When the HFP-overflow control is zero, HFP-overflow is reported as an IEEE-invalid-operation exception and is subject to the IEEE-invalid-operation mask in the FPC register. This is called an HFP-overflow-as-IEEE-invalid-operation condition. When the HFP-overflow control is one, HFP overflow is reported as an IEEE-overflow exception and is subject to the IEEE-overflow mask in the FPC register. This is called an HFP-overflow-as-IEEE-overflow condition.

HFP Underflow: An HFP-underflow condition exists when the precision-rounded value is nonzero and less in magnitude than the HFP target precision's smallest normalized number, Hmin. That is, when the characteristic of a normalized HFP result would be less than zero and the fraction is not zero. The result is set to a true zero with the same sign as the source. Reporting of the HFP-underflow condition is subject to the HFP-underflow control. The result in this case, however, is inexact and is subject to the controls for that condition. When the HFP-underflow control is zero, the HFP underflow condition is not reported. When the HFP-underflow control is one, HFP underflow is reported as an IEEE-underflow exception and is subject to the IEEE-underflow mask in the FPC register. This is called an HFP-underflow-as-IEEE underflow condition.

Perform Timing Facility Function Instruction:

When executed by a computer system, a timing facility function specified by the function code in general register 0 is performed. The condition code is set to indicate the outcome of the function. General register 1 contains the address of a parameter block in storage. PTFF query functions place information in the parameter block; PTFF control functions use information obtained from the parameter block. As observed by other CPUs and channel programs, references to the parameter block may be multiple access references, accesses to these storage locations are not necessarily block-concurrent, and the sequence of these accesses or references is undefined. Bit positions 57-63 of general register 0 contain the function code. Bit 56 of general register 0 must be zero; otherwise, a specification exception is recognized. All other bits of general register 0 are ignored. General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. The PTFF-QAF (Query Available Functions) function provides the means of indicating the availability of the other functions. The PTFF-QAF function indicates whether the function is installed for a program running in supervisor state at the basic-machine level.

PTFF-QAF (Query Available Functions)

The parameter block used for the function has the following format: A 128-bit field is stored in the parameter block. Bits 0-127 of this field correspond to function codes 0-127, respectively, of the PTFF instruction. When a bit is one, the corresponding function is installed; otherwise, the function is not installed. Bits 0-3 of pb.w1 are set to ones, as these bits represent function codes 0-3, which are currently assigned to query functions. Bits 4-31 of pb.w1 are reserved for additional query functions. Bits 0-3 of pb.w3 are set to ones, as these bits represent function codes 64-67, which are currently assigned to control functions. Bits 4-31 of pb.w3 are reserved for additional control functions. Parameter block words pb.w2 and pb.w4 are reserved for future extensions.

PTFF-QTO (Query TOD Offset)

The 64-bit physical-clock value returned (pb.Tu) is the value of the physical clock at the most recent TOD-offset-update event. The 64-bit TOD-offset value returned (pb.d) indicates the value of the TOD-offset (d). This is the current value being added to Tr (the physical clock) to obtain Tb (the basic-machine TOD clock); that is, Tb=Tr+pb.d. The 64-bit logical-TOD-offset value returned (pb.dl) indicates the current value being added to Tr (the physical clock) to obtain Tc (the logical TOD clock for the current level of CPU execution); that is, Tc=Tr+pb.dl. Thus, when executed at the basic-machine level, pb.dl=pb.d=d; when executed at the logical partition level, the Tp-Tb epoch difference (Dp) is added, resulting in pb.dl=d+Dp; and when executed at the virtual-machine level, the Tv-Tp epoch difference (Dv) is also added, resulting in pb.dl=d+Dp+Dv. Carries, if any, out of bit position 0 are ignored in the addition for each of these equations. The 64-bit TOD epoch difference value returned (pb.ed) is the TOD epoch difference for the current level of CPU execution. When executed at the basic machine level, this value is zero; when executed at the logical-partition level, this value is the Tp-Tb epoch difference (Dp); when executed at the virtual machine level, this value is the Tv-Tp epoch difference (Dv).

PTFF-QSI (Query Steering Information)

The 64-bit physical-clock value returned (pb.Tu) is the value of the physical clock at the most recent TOD-offset-update event. The remaining fields are the values of the old-episode and new-episode registers.

PTFF-QPT (Query Physical Clock)

The 64-bit physical-clock value returned (pb.Tr) is the current value of the physical clock. Zeros are stored for the rightmost bit positions that are not provided by the physical clock. When the clock is running, two executions of PTFF-QPT, either on the same or different CPUs, do not necessarily return different values of the clock.

PTFF-ATO (Adjust TOD Offset)

The 64-bit value (pb.a) from the parameter block, treated as an unsigned-binary value, is added to the base offset of the next episode. A carry if any, out of bit position 0 is ignored in this addition. The effect is not immediate, but is scheduled to coincide with the next TOD-offset-update event. If the next episode has already been scheduled, and has not yet become active, then the sum of pb.a and new.b replaces new.b and no other action is taken. If the next episode has not been scheduled (that is, the new-episode registers are the current episode), then the new-episode registers are saved in the old episode registers and a new episode is scheduled (thus, making the old-episode registers the current episode). The new-episode start time (new.s) is set to the value the physical clock will have at the next TOD-offset-update event and the new-episode base offset (new.b) is set to the sum of pb.a and the value the TOD-offset would have had at that same instant, computed using the current steering parameters. The steering rate is not changed by this function, if a new episode is scheduled, the new-episode finesteering and gross-steering rates are the same as the current values. Execution of the adjust-TOD-offset function is interlocked such that the entire contents of the TOD-offset register appear to be updated concurrently and simultaneously as observed by all CPUs in the configuration. However, accesses to the logical TOD clocks (basic-machine TOD clock, logical-partition TOD clock, and virtual-machine TOD clock) by CPUs in the configuration are not artificially delayed; thus, addition of a large unsigned adjustment value may have the effect of a negative change and may cause the logical TOD clocks to appear to step backwards.

PTFF-STO (Set TOD Offset)

The 64-bit value (pb.d) from the parameter block replaces the TOD offset. When issued at the basic-machine level, the effect is not immediate, but is scheduled to coincide with the next TOD-offset-update event. If the next episode has already been scheduled, and has not yet become active, then pb.d replaces new.b and no other action is taken. If the next episode has not been scheduled (that is, the new-episode registers are the current episode), then the new-episode registers are saved in the old episode registers and a new episode is scheduled (thus, making the old-episode registers the current episode). The new-episode start time (new.s) is set to the value the physical clock will have at the next TOD-offset-update event and the new-episode base offset (new.b) is set to the value of pb.d. The steering rate is not changed by this function, if a new episode is scheduled, the new-episode fine steering and gross-steering rates are the same as the current values. When issued at the logical-partition or virtual machine level, the function may be simulated by the hypervisor and operates on the TOD epoch difference for the current level of CPU execution (Dp or Dv, respectively); no new episode is scheduled and the change takes effect immediately. Execution of the set-TOD-offset function is interlocked such that the entire contents of the TOD-offset register appear to be updated concurrently and simultaneously as observed by all CPUs in the configuration. However, accesses to the logical TOD clocks (basic-machine TOD clock, logical-partition TOD clock, and virtual-machine TOD clock) by CPUs in the configuration are not artificially delayed; thus, replacement of the TOD offset by a smaller value may cause the logical TOD clocks to appear to step backwards.

PTFF-SFS (Set Fine-Steering Rate)

The 32-bit value (pb.f) from the parameter block becomes the fine-steering rate for the next episode. The effect is not immediate, but is scheduled to coincide with the next TOD-offset-update event. If the next episode has already been scheduled, and has not yet become active, then pb.f replaces new.f and no other action is taken. If the next episode has not been scheduled (that is, the new-episode registers are the current episode), then the new-episode registers are saved in the old episode registers and a new episode is scheduled (thus, making the old-episode registers the current episode). The new-episode start time (new.s) is set to the value the physical clock will have at the next TOD-offset-update event and the new-episode base offset (new.b) is set to the value the TOD-offset will have at that same instant, computed using the current steering parameters. The new-episode fine steering rate (new.f) is set to pb.f and the new-episode gross-steering rate is the same as the current value. When the new episode takes effect, accesses to the logical TOD clocks by CPUs in the configuration are interlocked to ensure that the logical TOD clocks appear to be unique and monotonically increasing as observed by all programs.

PTFF-SGS (Set Gross-Steering Rate)

The 32-bit value (pb.g) from the parameter block becomes the gross-steering rate for the next episode. The effect is not immediate, but is scheduled to coincide with the next TOD-offset-update event. If the next episode has already been scheduled, and has not yet become active, then pb.g replaces new.g and no other action is taken. If the next episode has not been scheduled (that is, the new-episode registers are the current episode), then the new-episode registers are saved in the old episode registers and a new episode is scheduled (thus, making the old-episode registers the current episode). The new-episode start time (new.s) is set to the value the physical clock will have at the next TOD-offset-update event and the new-episode base offset (new.b) is set to the value the TOD-offset will have at that same instant, computed using the current steering parameters. The new-episode gross steering rate (new.g) is set to pb.g and the new-episode fine-steering rate is the same as the current value. When the new episode takes effect, accesses to the logical TOD clocks by CPUs in the configuration are interlocked to ensure that the logical TOD clocks appear to be unique and monotonically increasing as observed by all programs.

Instruction Blocking Facility:

Referring to FIG. 8, the function of a Virtual Architecture Level (VAL) Instruction Blocking facility in a VM is shown. Each instruction to be executed in the VM (as shown in the Instructions in Storage column), includes an opcode. In some implementations, the opcode is a single field in the instruction 901 902 903 904. In other implementations, opcodes may be distributed in more than one field of the instruction 905 (OpCode||OC) 906 (OpCode||OpCode). Preferably, circuits, microcode or a combination thereof, would determine, based on the opcode, whether the instruction to be executed was supported or not by the current Virtual machine. If it was not supported, a program interruption, for example a program exception would be indicated and the instruction suppressed.

In an implementation, the opcode of the instruction to be executed would be used to index into an opcode table 907 to locate an entry associated with the opcode. The entry located, would include a code indicating the machine level supported by the opcode. In another implementation, each Virtual machine would have an opcode table and the entry in the table would indicate whether the opcode was supported by the Virtual machine.

Figure 9:
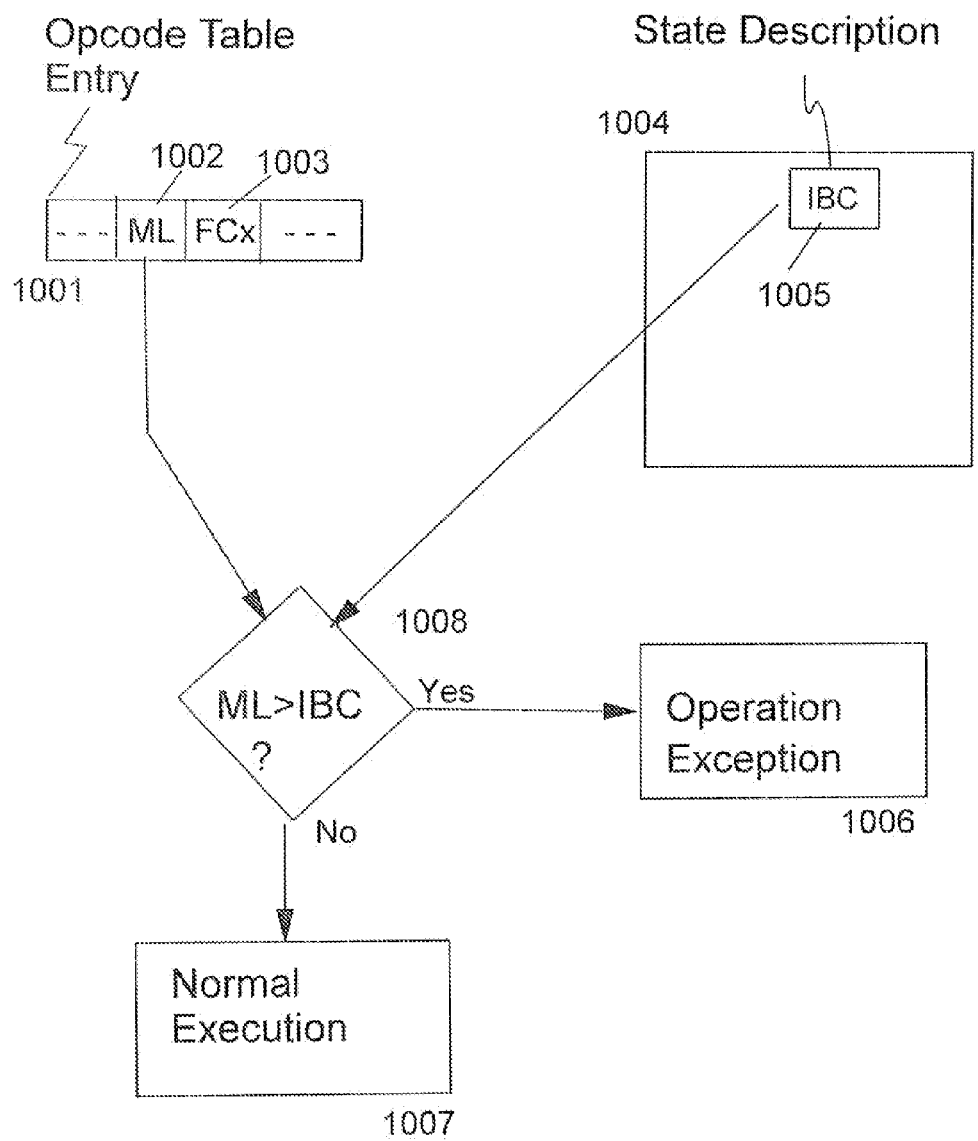
FIG. 9 is a flow depicting an example blocking technique.

Referring to FIG. 9, the code (machine level (ML)) 1002 obtained from the table 907 would be compared 1005 against a state description entry (IBC) 1008 of a state description table 1004 of the Virtual machine, and if the machine level code 1002 was greater than the IBC state description entry 1008, the instruction would execute normally 1007, otherwise, the attempt to execute would result in a program exception 1006. In another embodiment, fields of the instruction in addition to, or other than the OpCode field may be used to index into the opcode table 907. For example, an opcode may have reserved fields (to be 0 or ignored) in a prior machine architecture, that are employed in newer architecture levels to provide new function. An embodiment would include these bits with the OpCode to index into the opcode table 907. In another embodiment the opcode table 907 may have fields in addition to the ML field used to indicate the permitted use of reserved bits in the associated instruction. For example, if the instruction has 4 reserve bits, the ML table may contain 0000 if all the bits must be 0, or 1's in selected bits where a 1 indicates that corresponding previously reserved bits of the field can be 0 or 1 (permitting the newly introduced function of the instruction for the VM).

Instruction Test/Query Facility:

If a FUNCTION BLOCKING FACILITY of the Instruction Test/Query facility is installed (FIG. 10), the Opcode table entry 1001 may, in an embodiment, additionally include a function code field (FCx) 1003 (or a pointer to a function code table 1108). The function code field 1003 (or the function code table 1108 entry 1107) is compared 1103 with the function code to be executed 1102. If the function code compares, the instruction is permitted 1105 to use the function code, if the function code doesn't compare 1103, the instruction execution causes a program interruption such as a program exception or specification exception (program check) 1104.

Figure 11:
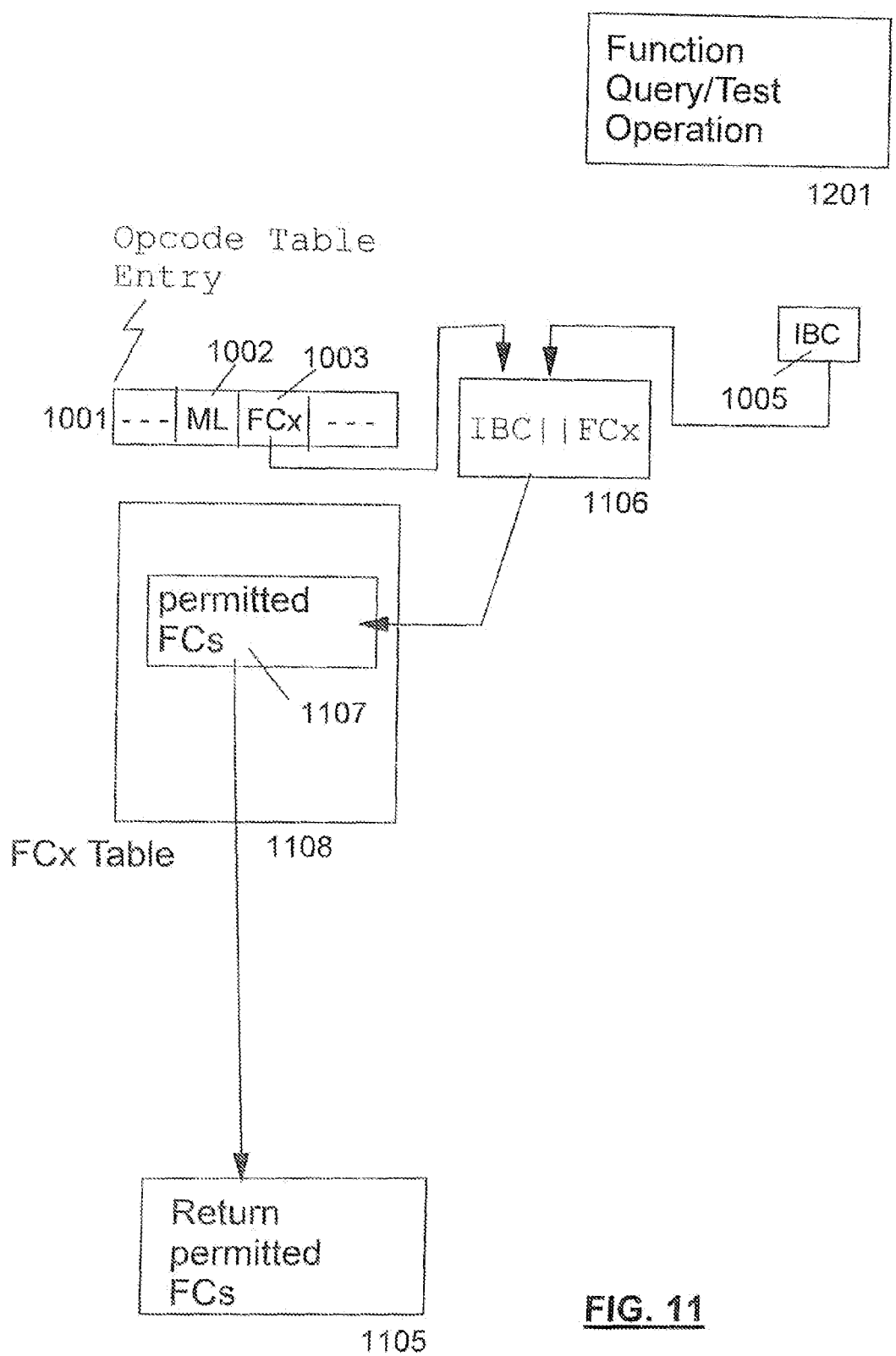
FIG. 11 is a flow depicting an example blocking technique.

Referring to FIG. 11, if a FUNCTION TEST/QUERY BLOCKING FACILITY of the Instruction Test/Query facility is installed, if any query instruction 1201 is executed to determine the installed function of the instruction, only the function codes permitted by the Virtual machine are returned 1205. In an embodiment, a bit significant table 1108 is provided for the Virtual machine that is used by the Virtual machine to respond to such queries. In another embodiment, a mask is provided (not shown) to the Virtual machine to be ANDed with the installed function codes of the Host machine to create a result of permitted function codes 1107 of the instruction in the VM.

Referring to FIG. 8, example z/Architecture instruction formats are shown. Format 901 depicts a 2 byte format wherein the OpCode (Op) occupies the high order byte, and general register fields R1 and R2 occupy respective 4 bits of the remaining byte. Format 902 depicts a 2 byte OpCode only instruction format. Format 903 depicts a 4 byte (word) instruction having a 1 byte OpCode (Op) followed by 3 register fields, (R1, X2 and B2) and then an immediate field called the Displacement field (D2). Format 904 depicts a 4 byte instruction having a 4 byte OpCode (Op), followed by a 4 bit register field (B2) and then a 12 bit Immediate field (I2). Format 905 depicts a 4 byte instruction having a 2 byte OpCode (Op) followed by a 4 bit mask M1, followed by a 4 bit OpCode extension (Op) and a reserved 4 bit field, followed by a 12 bit Immediate field (I2). Format 906 depicts a 6 byte instruction having a 1 byte OpCode (Op) followed by 3 register fields, (R1, X2 and B2) and then an immediate field called the Displacement field (DL2) followed by a 8 bit immediate field (DH2) and an 8 bit OpCode extension (Op).

Referring to FIGS. 8 and 9, in an embodiment, when an instruction is fetched for execution by a logical processor of a virtual machine, an Opcode Table 907 is searched, using the OpCode(s) of the instruction as a search argument. If an entry is found 1001 for the instruction, the entry includes information 1002 1003 for determining instruction permission information. In a preferred embodiment, an entry includes a field 1002 that specifies a code (ML) indicating the machine level of the architecture supporting the instruction. A state description 1004 is provided for each VM. The state description includes a field (IBC) 1005 that represents the machine level of the architecture that the VM is to simulate. If 1005, the machine level of the architecture supporting the instruction (ML) is greater than the machine level of the architecture that the VM is to simulate (IBC), a program Exception (Program Check) is signaled, and in an embodiment, the execution of the instruction may be suppressed. On the other hand, if the machine level of the architecture supporting the instruction (ML) is not greater than the machine level of the architecture that the VM is to simulate (IBC), the instruction is permitted to execute.

In some environments instructions are provided that are able to execute any of a plurality of functions (such as the CIPHER MESSAGE instruction described supra). The selection of the function by an instruction may be by way of specifying a function code (FC) representing the function. The Function Code may be indirectly specified by the instruction or explicitly specified by bits or fields of the instruction for example. In some cases, certain function codes may be initially implemented (0-3 for example) in a machine architecture level, and additional function codes may be added at later machine architecture levels. The VM can be provided with the capability to only permit function codes to execute of an older architecture level.

Figure 10:
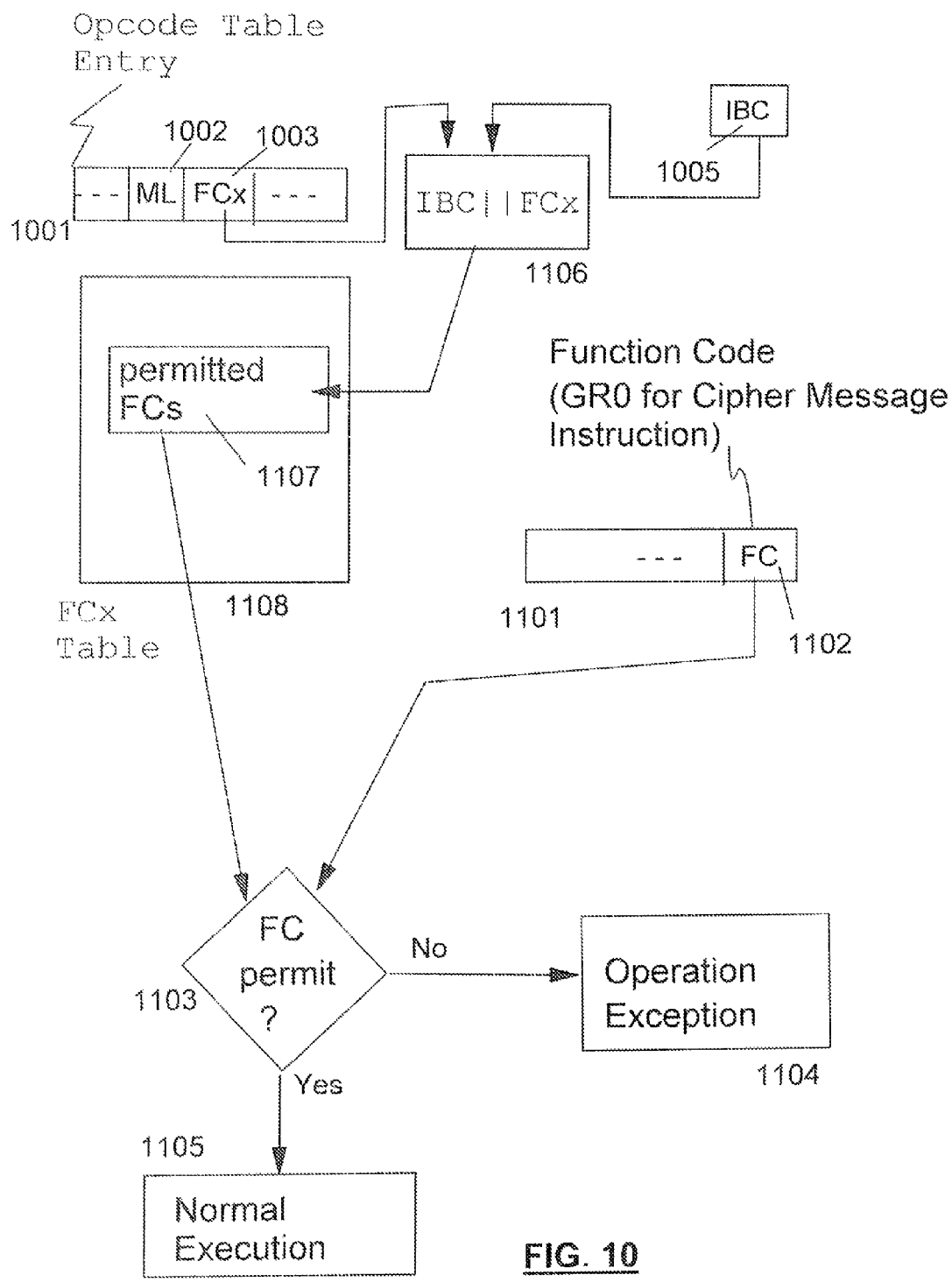
FIG. 10 is a flow depicting an example blocking technique.

Referring to FIG. 10, this may be accomplished by having a function code field (FCx) 1003 in the Opcode Table Entry 1001. When an instruction is about to be executed, the FCx field 1003 specifies the allowed function code list to be returned rather than the actual function codes supported by the Host processor. In embodiment, the FCx 1003 field of the Opcode Table entry is concatenated with the IBC field 1005 to index into an FCx Table 1108 to locate an entry that comprises permitted function codes (TVs) 1107. The permitted FCs 1107 are compared with the FC specified by the instruction 1102 (in the Cipher Message instruction, bits 1102 of general register 0 1101 contain the specified FC 1102). If 1103 the FC value is permitted 1105, normal execution of the function represented by the FC bits is permitted. If 1103 the FC value is not permitted 1104, a program exception (program check) event is performed. Similarly, when executing a Function Query/test operation 1201 (such as the CIPHER MESSAGE instruction Query operation), the FCX bits of the Opcode Table Entry 1003 are concatenated 1106 with the IBC bits 1005 to index into the FCX table to locate the permitted FCs 1107 for the instruction whose OpCode locates the Opcode Table Entry 1001. The permitted FCs are then returned 1105 to the location specified by the Function Query/Test operation.

In an embodiment, when the FCX bits are 0, no FCx Table 1108 access is performed and any Function Code indicated by the corresponding instruction is used without translation.

In an embodiment, other architecture modifications to instructions can use the same mechanism as described for Function codes. In this case for example, instruction 905 at an architectural level has the bits between the OpCode extension field and the I2 field, reserved (0000). Preferably, the reserved bits are tested for 0's to make sure the instruction will perform properly in an environment where non-zero bits support not yet supported function. A newer architecture implements a new function using one or more of the reserved bits to identify the new function. In an example, these 4 reserved bits (Res) may index into the FCx Table 1108 in order to determine if they are supported as shown for FC bits 1102 in FIG. 10. In this case, the concatenation would be 0∥IBC∥FCx for Function codes, and 1∥IBC∥FCx for the new function permission test 1103. Instead of the FC 1102 being compared with the permitted FCs 1107, the Res field of the instruction 905 would be checked against the permitted FCs bits 1107 to determine 1103 if the function is permitted.

In another embodiment, the Res field of the instruction 905 could be concatenated as if it were a third OpCode extension of 905 OpCodes to index into the Opcode Table 907 to determine if the function introduced with the field is permitted.

As a part of or subsequent to, the fetching of an instruction, a CPU may determine certain attributes of the instruction, for example, number of operands, type of operands (storage or register), operand alignment requirements, and authorization requirements. In an emulation environment, this determination may be the result of a simple table look-up using the operation code as an index; in a high-performance CPU, the determination may be built into the instruction-decode circuitry of the processor.

The virtual-architecture-level facility introduces an additional attribute associated with each instruction: the machine level at which the instruction was first introduced to the architecture. This machine level may be encoded numeric point on a continuum (for example, 10.2, meaning the 10th-generation machine at the second firmware level), or it may simply be a value relative to the most-recent machine level (for example, 2 [or −2], meaning that the instruction was introduced two machine generations prior to the current machine).

Referring to FIG. 12 in an embodiment, selected installed functions of a multi-function instruction are hidden, the multi-function instruction architected to perform a function of a plurality of installed functions, the hiding comprising setting 1201 a value controlling availability of installed functions to a multi-function instruction of a Host computer comprising one or more processors, a processor having a first plurality of said installed functions of the multi-function instruction, the first plurality of installed functions comprising one or more first installed functions and one or more second installed functions, and executing 1202 a multi-function instruction, the multi-function instruction comprising an opcode field, the execution comprises responsive to the multi-function instruction specifying a query function, performing the query function to determine installed functions available to the multi-function instruction; the query function execution uses the value to determine the one or more second installed functions; and the query function execution stores 1203 a result value indicating one or more of the one or more second installed functions are not available to the multi-function instruction.

Referring to FIG. 13, in an embodiment, the value is set 1301 by a hypervisor of the Host computer for a virtual machine of the Host computer, the virtual machine comprising one or more logical processors, the one or more logical processors being assigned to one or more physical processors, a physical processor having the one or more second installed functions of the multi-function instruction, wherein the multi-function instruction is executed in the virtual machine by a logical processor of one or more logical processors on a physical processor of the one or more physical processors.

In an embodiment, the one or more second installed functions is determined 1302 based on the opcode of the multi-function instruction.

Referring to FIG. 14, in an embodiment, the hypervisor having set 1201 a control value in a virtual machine, sets 1401 another value controlling availability of installed functions to a multi-function instruction executing on another virtual machine of the Host computer system; and another multi-function instruction is executed 1402 in the another virtual machine by another logical processor of one or more another logical processors; responsive to the another multi-function instruction specifying another query function, the another query function is performed to determine installed functions available to the another multi-function instruction; the another query function execution uses the another value to determine one or more third installed functions; and the another query function execution stores 1403 another result value indicating one or more of the one or more third installed functions are not available to the another multi-function instruction.

In an embodiment, the stored result value is a bit significant value, where each bit position corresponds to a function, and a bit being 1 indicates the corresponding function is installed.

Referring to FIG. 15, in an embodiment, the query function is specified by a multi-function instruction specified function code 1501 or a multi-function instruction specified test bit 1502.

Figure 16:
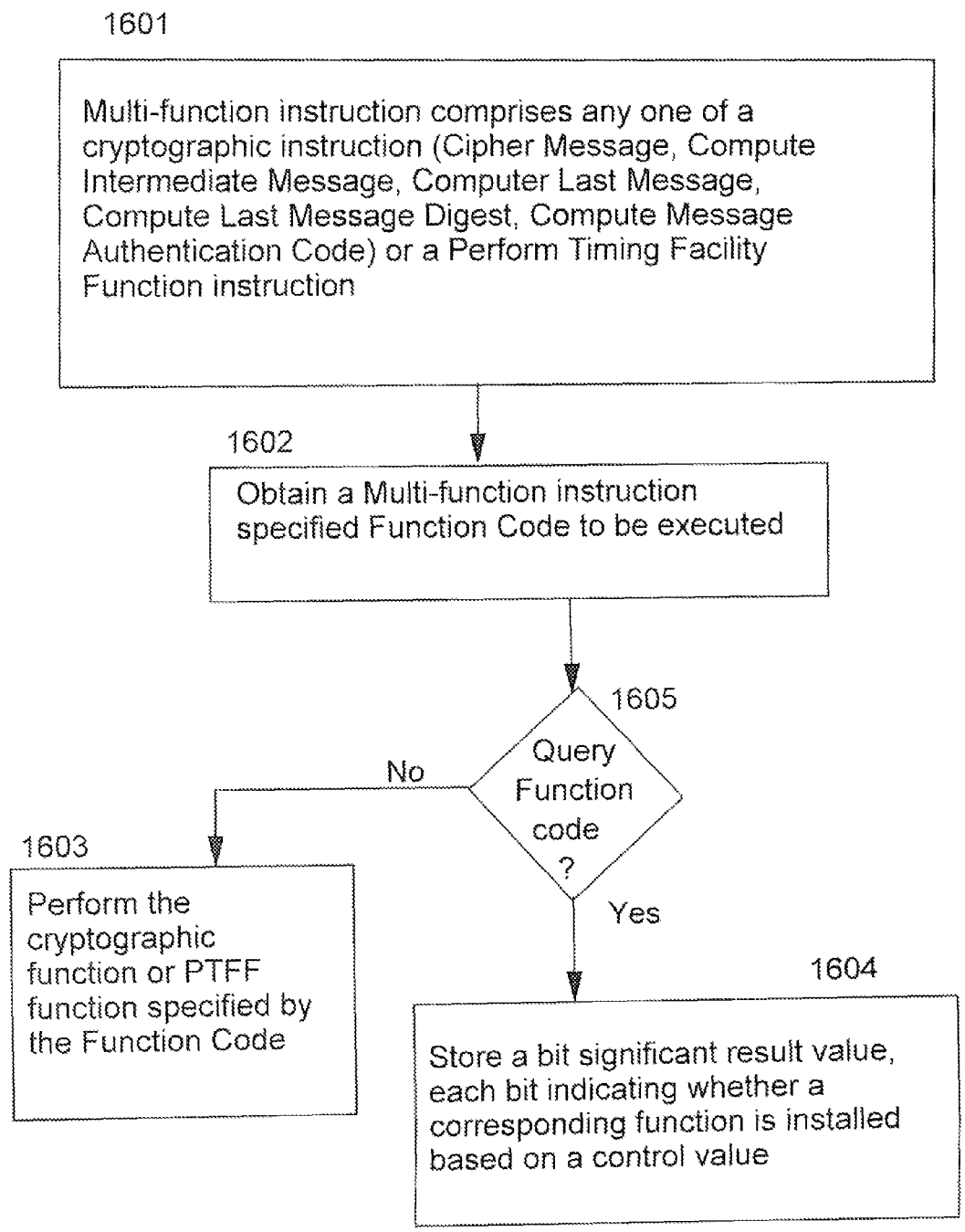
Figure 17:
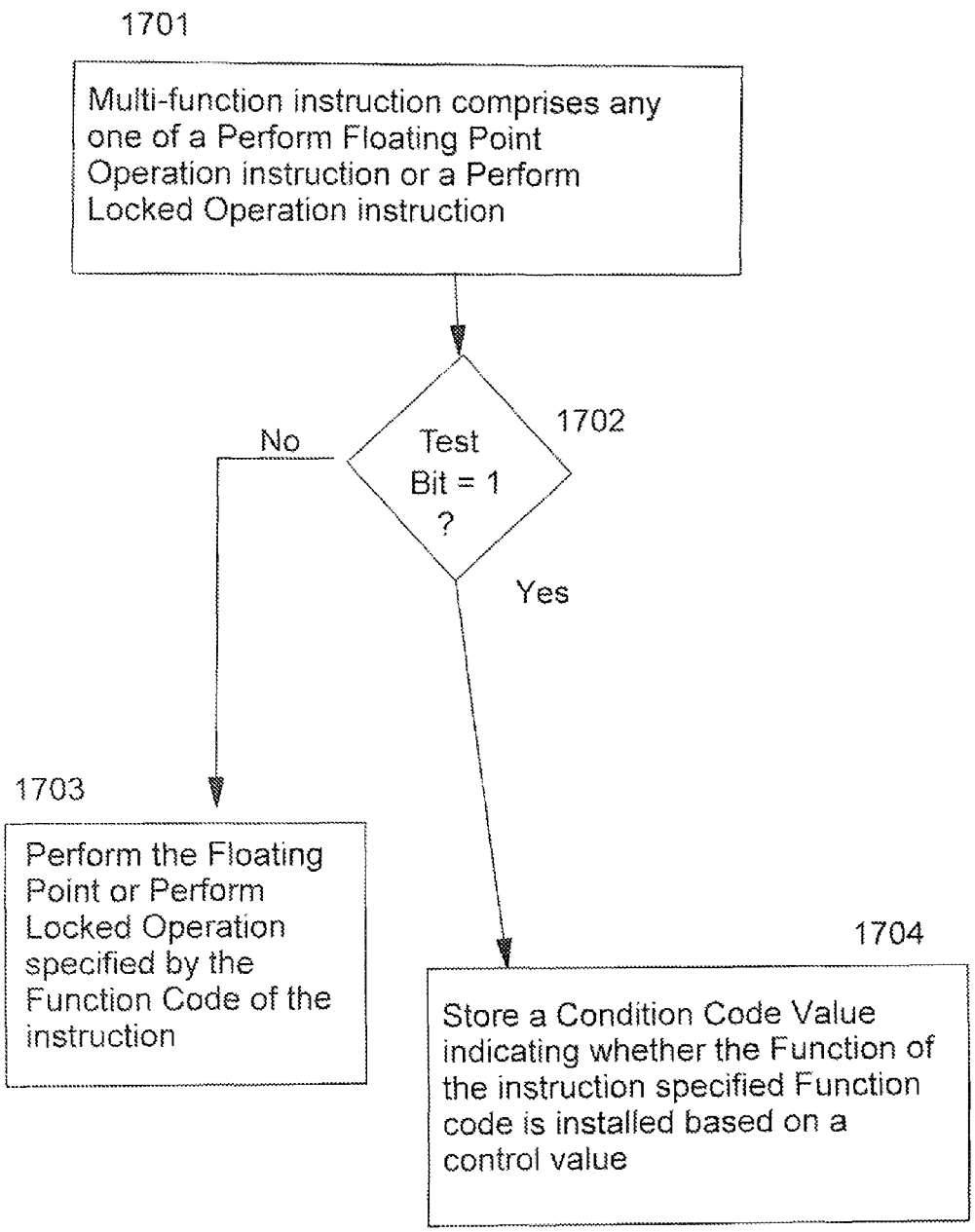

Referring to FIG. 16, in an embodiment, the multi-function instruction is a zArchitecture instruction consisting of any one of a 1601 cryptographic instruction, a Perform Timing Facility Function instruction, or FIG. 17 any one of 1701 Perform Floating Point Operation instruction or a Perform Locked Operation instruction, wherein the cryptographic instruction comprises any one of a Cipher Message instruction, a Compute Intermediate Message instruction, a Compute Last Message Digest instruction, a Compute Last Message Digest instruction, a Compute Message Authentication Code instruction, wherein the multi-function instruction specifies a query function; responsive to the multi-function instruction being a cryptographic instruction or a PTFF instruction; the multi-function instruction specified function code to be executed is obtained 1602, the obtained function code consisting 1605 of a query function, wherein the stored 1604 result value based on a control value is a plurality of bits, each bit of the plurality of bits indicating whether a corresponding function code is supported; and responsive to the multi-function instruction being a cryptographic instruction or a PTFF instruction, the multi-function instruction specified function code to be executed is obtained, the obtained function code not being the query function 1605, a cryptographic function or a PTFF function is performed 1603 according to the obtained function code; and 1701 responsive to the multi-function instruction being the Perform Locked Operation instruction or the Perform Floating Point Operation instruction and the multi-function instruction specified test bit is 1 1702, a determination 1704 is made whether a multi-function instruction specified function code is installed based on the control value, wherein the stored result value 1704 is a condition code value; and responsive to the multi-function instruction being the Perform Locked Operation instruction or the Perform Floating Point Operation instruction and the multi-function instruction specified test bit is 0 1702, a Floating Point function or a locked operation is performed 1703 according to the obtained function code.

In an embodiment, responsive to the multi-function instruction specifying a non-query function of the first plurality of said installed functions, responsive to the non-query function being one of said second installed functions, the non-query function is performed, and responsive to the non-query function being a function other than one of said second installed functions, performance said non-query function is blocked.

The forgoing may be useful in understanding the terminology and structure of one computer system embodiment. Embodiments may be not limited to the z/Architecture or to the description provided thereof. Embodiments can be advantageously applied to other computer architectures of other computer manufacturers with the teaching herein.

While preferred embodiments have been illustrated and described herein, it may be to be understood that embodiments may be not limited to the precise construction herein disclosed, and the right may be reserved to all changes and modifications coming within the scope of the invention as defined in the appended claims.

What is claimed is:

1. A computer implemented method for hiding selected installed functions of a multi-function instruction, the multi-function instruction being architected to be executed by a single processor to cause the single processor to perform a single function of a plurality of installed functions, the single function being identified by the multi-function instruction, the plurality of installed functions comprising a query function to discover installed functions and one or more non-query functions to operate on operands of a multi-function instruction, the method comprising:

setting, by a hypervisor, a control value configured to control availability of installed functions to multi-function instructions of a virtual machine of a Host computer comprising one or more processors, each of said one or more processors being configured to perform each of a plurality of said installed functions, the plurality of installed functions comprising one or more first installed functions and one or more second installed functions, the hypervisor being configured to create virtual machines; and based on the control value, making the one or more first installed functions of a processor unavailable to multi-function instructions of the virtual machine and making the one or more second installed functions of the processor available to the multi-function instructions of the virtual machine; and executing a multi-function instruction by the virtual machine, the multi-function instruction comprising an opcode field and specifying a single function to be performed of the plurality of installed functions, the multi-function instruction being configured to select any one of a plurality of functions, including a query function and one or more non-query functions, the execution of the multi-function instruction comprising:

based on the multi-function instruction specifying a query function as the single function to be performed, performing the query function, the performing the query function comprising x)-y):

x) using the control value to determine that the one or more first installed functions are unavailable and that the one or more second installed functions are available; and y) storing a result value, the stored result value indicating that the one or more first installed functions are not available to multi-function instructions of the virtual machine and that the one or more second installed functions are available to multi-function instructions of the virtual machine; and based on the multi-function instruction specifying a non-query function as the single function to be performed, performing the non-query function comprising a)-c):

a) using the control value to determine that the one or more first installed functions are unavailable and that the one or more second installed functions are available;

b) based on the non-query function being one of said second installed functions, performing the non-query function; and c) based on the non-query function being one of said first installed functions, blocking performing said non-query function so that it is not performed on the virtual machine, in hardware or otherwise.

2. The method according to claim 1, wherein the virtual machine comprises one or more logical processors, the one or more logical processors being assigned to one or more physical processors, a physical processor having the plurality of installed functions of the multi-function instruction, wherein the multi-function instruction is executed in the virtual machine by a logical processor of one or more logical processors on a physical processor of the one or more physical processors.

3. The method according to claim 2, wherein the making the one or more first installed functions of a processor unavailable to the multi-function instruction and the one or more second installed functions of the processor available to the multi-function instruction is based on the opcode of the multi-function instruction.

4. The method according to claim 2, further comprising:
setting, by the hypervisor, another control value configured to control availability of installed functions to a multi-function instruction executing on another virtual machine of the Host computer; and
based on the other control value, making one or more third installed functions of a processor unavailable to another multi-function instruction and one or more fourth installed functions of the processor available to the other multi-function instruction; and
executing the other multi-function instruction on the other virtual machine by another logical processor of the one or more other logical processors, the other multi-function instruction comprising another opcode field;
based on the other multi-function instruction specifying another query function, performing the other query function, the performing the other query function comprising:
using the other control value to determine that the one or more third installed functions are unavailable and that the one or more fourth installed functions are available; and
storing another result value indicating that the one or more third installed functions are not available to the other multi-function instruction and the one or more fourth installed functions are available to the other multi-function instruction.

5. The method according to claim 2, wherein the stored result value is a bit significant value, wherein each bit position corresponds to a function, and a bit being 1 indicates that the corresponding function is available to multi-function instructions.

6. The method according to claim 2, wherein the function is specified by any one of a corresponding function code specified by the multi-function instruction and a corresponding bit specified by the multi-function instruction.

7. The method according to claim 6, wherein the multi-function instruction is a z/Architecture instruction consisting of any one of a cryptographic instruction, a Perform Timing Facility Function (PTFF) instruction, Perform Floating Point Operation instruction and a Perform Locked Operation instruction, wherein the cryptographic instruction comprises any one of a Cipher Message instruction, a Cipher Message with Chaining instruction, a Compute Intermediate Message Digest instruction, a Compute Last Message Digest instruction and a Compute Message Authentication Code instruction, and wherein execution of the multi-function instruction comprises:
based on the multi-function instruction being a cryptographic instruction or a PTFF instruction, obtaining the function code specified by the multi-function instruction to be executed, and performing f)-g) comprising:

f) based on the obtained function code specifying the query function, wherein the stored result value is a plurality of bits, each bit of the plurality of bits indicating whether a corresponding function is available to the multi-function instruction, the corresponding function being any one of a cryptographic function and a PTFF function; and g) based on the obtained function code specifying the non-query function, performing any one of a cryptographic function and a PTFF function according to the obtained function code; and based on the multi-function instruction being the Perform Locked Operation instruction or the Perform Floating Point Operation instruction and a multi-function instruction specified test bit being 1, determining that a multi-function instruction specified function is installed, wherein the stored result value is a condition code value; and based on the multi-function instruction being the Perform Locked Operation instruction or the Perform Floating Point Operation instruction and the multi-function instruction specified test bit being 0, performing a Floating Point operation or a locked operation according to the obtained function code.

8. The method according to claim 1, wherein the blocking the performing said non-query function comprises blocking execution of the multi-function instruction.

9. The method according to claim 8, wherein the blocking execution of the multi-function instruction comprises causing a program exception event to occur, the program exception comprising a program interruption to an operating system program.

10. A computer implemented method for hiding selected installed functions of a multi-function instruction, the multi-function instruction being architected to be executed by a single processor to cause the single processor to perform a single function of a plurality of installed functions, the single function being identified by the multi-function instruction, the plurality of installed functions comprising one or more non-query functions to operate on operands of a multi-function instruction, the method comprising:
setting, by a hypervisor, a control value configured to control availability of installed functions to multi-function instructions of a virtual machine of a Host computer comprising one or more processors, each of said one or more processors being configured to perform each of a plurality of said installed functions, the plurality of installed functions comprising one or more first installed functions and one or more second installed functions, the hypervisor being configured to create virtual machines; and
based on the control value, making the one or more first installed functions of a processor unavailable to multi-function instructions of the virtual machine and making the one or more second installed functions of the processor available to the multi-function instructions of the virtual machine; and
executing a multi-function instruction by the virtual machine, the multi-function instruction comprising an opcode field and specifying a single function to be performed of the plurality of installed functions, the multi-function instruction being configured to select any one of a plurality of functions, including one or more non-query functions, the execution of the multi-function instruction comprising:

based on the multi-function instruction specifying a non-query function as the single function to be performed, performing the non-query function comprising a)-c):
a) using the control value to determine that the one or more first installed functions are unavailable and that the one or more second installed functions are available;
b) based on the non-query function being one of said second installed functions, performing the non-query function; and
c) based on the non-query function being one of said first installed functions, blocking performing said non-query function so that it is not performed on the virtual machine, in hardware or otherwise.

* * * * *